US012761769B2

(12) United States Patent
Song et al.

(10) Patent No.: US 12,761,769 B2
(45) Date of Patent: Oct. 13, 2026

(54) SCREEN CONTROLLING METHOD AND DEVICE

(71) Applicant: SAMSUNG ELECTRONICS CO., LTD., Suwon-si (KR)

(72) Inventors: Seunggeun Song, Suwon-si (KR); Dukhyun Kim, Suwon-si (KR); Kwangho Lim, Suwon-si (KR); Sangheon Kim, Suwon-si (KR); Jongchae Park, Suwon-si (KR); Seonghoon Choi, Suwon-si (KR); Yeunwook Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 144 days.

(21) Appl. No.: 18/619,088

(22) Filed: Mar. 27, 2024

(65) Prior Publication Data

US 2024/0264714 A1 Aug. 8, 2024

Related U.S. Application Data

(63) Continuation of application No. 17/955,026, filed on Sep. 28, 2022, now Pat. No. 11,960,697, which is a (Continued)

(30) Foreign Application Priority Data

Aug. 10, 2021 (KR) ........................ 10-2021-0105051

(51) Int. Cl.
*G06F 3/0481* (2022.01)
*G06F 1/16* (2006.01)

(52) U.S. Cl.
CPC .......... *G06F 3/0481* (2013.01); *G06F 1/1641* (2013.01); *G06F 2203/04803* (2013.01)

(58) Field of Classification Search
CPC ................. G06F 3/0481; G06F 1/1641; G06F 2203/04803
See application file for complete search history.

(56) References Cited

U.S. PATENT DOCUMENTS 11,057,514 B1 * 7/2021 Noh ...................... G06F 1/1643
11,244,658 B1 2/2022 Hong et al.
(Continued)

FOREIGN PATENT DOCUMENTS

KR 20110085233 A 7/2011
KR 20120104626 A 9/2012
(Continued)

OTHER PUBLICATIONS

Markus Tatzgern et al., Adaptive Information Density for Augmented Reality Displays, Mar. 1, 2016, IEEE Virtual Reality Conference, pp. 83-92 (Year: 2016).*
(Continued)

*Primary Examiner* — Tam T Tran
(74) *Attorney, Agent, or Firm* — CANTOR COLBURN LLP

(57) ABSTRACT

A method and device for controlling a screen displayed on a display of an electronic device are provided. Aspects include displaying, on a first region of the display, a host window corresponding to an application run on the electronic device. Aspects also include displaying the first dependent window on a second region of the display corresponding to the first region based at least in part on a call of a first dependent window among dependent windows that are dependent on the host window. Aspects further include stacking and displaying, on the second region, a second dependent window among the dependent windows based at least in part on an event occurring in the first dependent window. Aspects further include initializing window display
(Continued)

on the second region based at least in part on an event occurring in the host window.

10 Claims, 25 Drawing Sheets

Related U.S. Application Data continuation of application No. PCT/KR2022/011638, filed on Aug. 5, 2022.

(56) References Cited

U.S. PATENT DOCUMENTS

| | | | | |
|---|---|---|---|---|
| 2013/0127918 | A1 | 5/2013 | Kang et al. | |
| 2020/0301641 | A1 | 9/2020 | Park et al. | |
| 2021/0150953 | A1 | 5/2021 | Lee et al. | |
| 2021/0405828 | A1* | 12/2021 | Jiang .................. | G06Q 30/0633 |
| 2023/0048429 | A1 | 2/2023 | Song et al. | |

FOREIGN PATENT DOCUMENTS

| | | | |
|---|---|---|---|
| KR | 20130108952 | A | 10/2013 |
| KR | 20140135404 | A | 11/2014 |
| KR | 20170071960 | A | 6/2017 |
| KR | 20190031870 | A | 3/2019 |
| KR | 20200026654 | A | 3/2020 |
| KR | 20200075809 | A | 6/2020 |
| KR | 102206948 | B1 | 1/2021 |
| KR | 102256292 | B1 | 5/2021 |
| KR | 20210060874 | A | 5/2021 |
| KR | 20210091298 | A | 7/2021 |
| KR | 102289412 | B1 | 8/2021 |

OTHER PUBLICATIONS

Johanna Schmidt et al., Popup-Plots: Warping Temporal Data Visualization, Sep. 1, 2019, IEEE Transactions On Visualization and Computer Graphics, vol. 25, No. 7, pp. 2443-2457 (Year: 2019).*

Chandra Narayanaswami, Form Factors for Mobile Computing and Device Symbiosis, Jan. 1, 2005, International Conference on Document Analysis and Recognition, pp. 1-5 (Year: 2005).

International Search Report with Written Opinion for International Application No. PCT/KR2022/011638; Application Filing Date Aug. 5, 2022; Date of Mailing Nov. 8, 2022 (9 pages).

R. D. Bringans et al., Challenges and Opportunities in Flexible Electronics, Dec. 1, 2016, IEEE Xplore, pp. 641-642 (Year: 2016).

Korean Office Action Issued In KR Application No. 10-2021-0105051; Mail Date Nov. 17, 2025; 11 Pages.

Korean Office Action with English Translation; KR Patent Application No. 10-2021-0105051; issued Jun. 2, 2026; 16 pages.

* cited by examiner

SCREEN CONTROLLING METHOD AND DEVICE

CROSS-REFERENCE TO RELATED APPLICATIONS

This application is a continuation application of U.S. patent application Ser. No. 17/955,026, filed on Sep. 28, 2022, which is a continuation application, claiming priority under § 365(c), of International Application No. PCT/KR2022/011638 designating the United States, filed on Aug. 5, 2022, in the Korean Intellectual Property Receiving Office and claiming priority to Korean Patent Application No. 10-2021-0105051 filed on Aug. 10, 2021, in the Korean Intellectual Property Office, the disclosures of which are incorporated by reference herein in their entireties.

BACKGROUND

1. Field

The disclosure relates to a method and device for controlling a screen displayed on a display.

2. Description of Related Art

Recently released electronic devices may provide a function of displaying two or more programs or application execution screens on a single display. For example, to display two or more application execution screens, an electronic device may split a display into two or more regions and display the application execution screens on the regions, or overlay a plurality of windows representing the application execution screens and display the overlaid windows.

SUMMARY

An aspect of various example embodiments described herein provides a method of controlling a screen displaying one or more application execution windows that are dependent on each other on a display of an electronic device.

An aspect of various example embodiments described herein provides a method of controlling a layout of a screen such that, when an execution window of an application of an external package is called from an execution window of a set application displayed on a split screen, the called application of the external package is displayed by being dependent on the execution window of the set application through the split screen.

However, technical aspects of the present disclosure are not limited to the foregoing aspects, and other technical aspects may also be present. Additional aspects of the disclosure will be set forth in part in the description which follows and, in part, will be apparent from the description, or may be learned by practice of the presented embodiments of the disclosure.

According to an example embodiment, there is provided a method of controlling a screen displayed on a display of an electronic device. The method includes: displaying, on a first region of the display, a host window corresponding to an application running on the electronic device; based at least in part on a call of a first dependent window among dependent windows that are dependent on the host window, displaying the first dependent window on a second region of the display corresponding to the first region; based at least in part on an event occurring in the first dependent window, stacking and displaying, on the second region, a second dependent window among the dependent windows; and based at least in part on an event occurring in the host window, initializing window display on the second region.

According to an example embodiment, there is provided a method of operating an application performed by a processor of an electronic device. The method includes: determining a layout for displaying one or more execution windows corresponding to the application based at least in part on a structure of a display exposed according to a form factor of the electronic device; based at least in part on the determined layout, determining a first region on which a host window among the execution windows is to be arranged and a second region on which one or more dependent windows dependent on the host window are to be arranged; based at least in part on receiving a request for execution of the application, controlling the display such that the host window is displayed on the first region; based at least in part on receiving an input calling a first dependent window among the dependent windows from the host window, controlling the display such that the first dependent window is displayed on the second region; and based at least in part on receiving an input calling a second dependent window from the first dependent window, controlling the display such that the second dependent window is stacked on the second region.

According to an example embodiment, there is provided an electronic device including a display configured to output a screen; a memory storing therein at least one application; and a processor operatively connected to the display and the memory and configured to execute the application and control the screen displayed on the display. As the application is run, the processor displays a host window corresponding to the application on a first region of the display; based at least in part on a call of a first dependent window among dependent windows that are dependent on the host window, display the first dependent window on a second region of the display; based at least in part on an event occurring in the first dependent window, stack and display a second dependent window among the dependent windows on the second region; and based at least in part on an event occurring in the host window, initialize window display on the second region.

According to various example embodiments, in a case in which another execution window is called from an execution window of a set application displayed on a split-screen of a display, displaying the called execution window on the split-screen with the called execution window being dependent on the calling execution window of the set application improves a user experience.

In addition, in a case in which the size of the display changes, controlling the screen to be displayed according to the changed size improves the adaptability and efficiency of the screen with respect to the changed size of the display.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
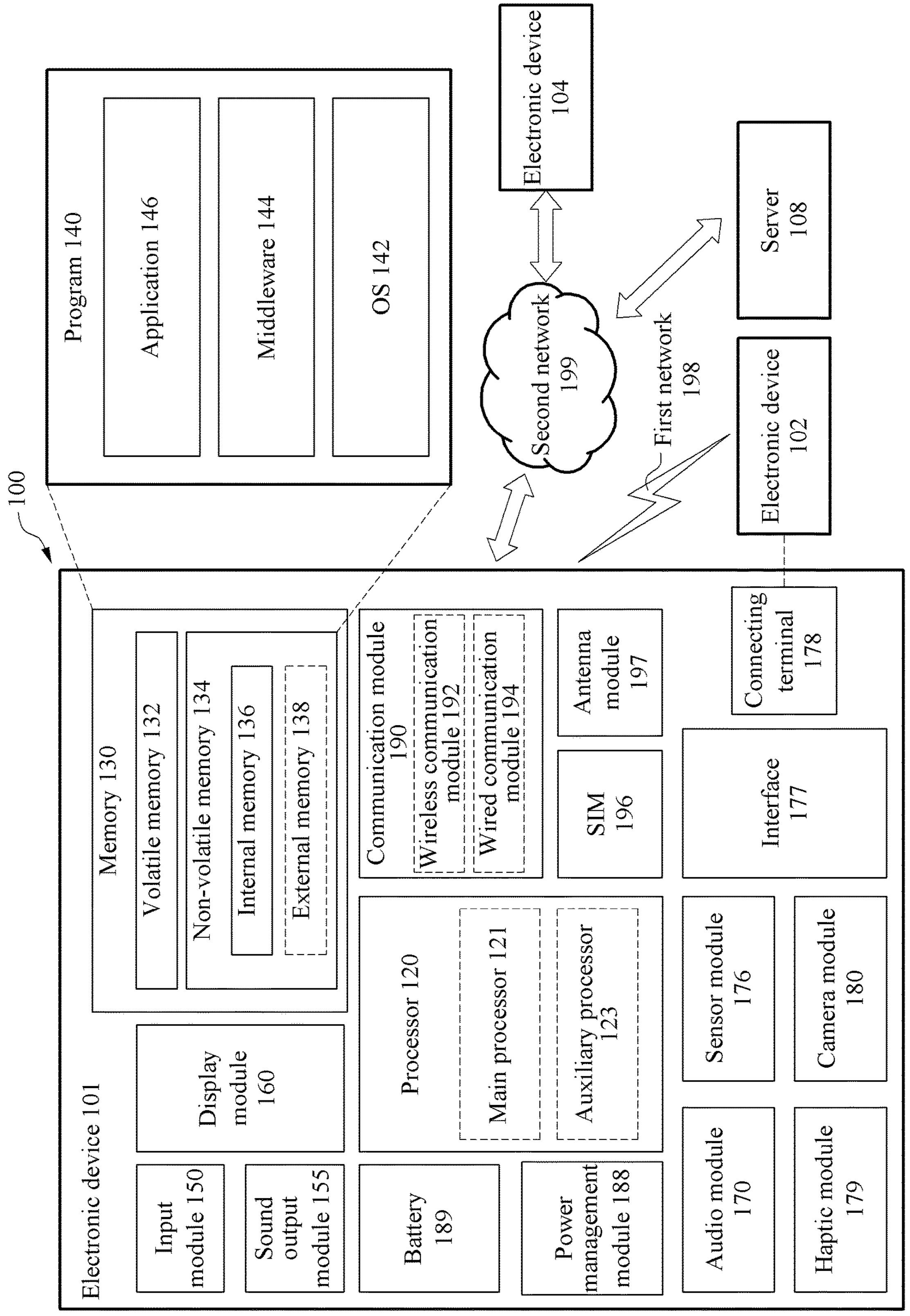
FIG. 1 is a block diagram illustrating an example electronic device in a network environment according to various example embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various example embodiments.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added to the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of the functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module

190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include volatile memory 132 and/or non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wired) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel.

The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least apart of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
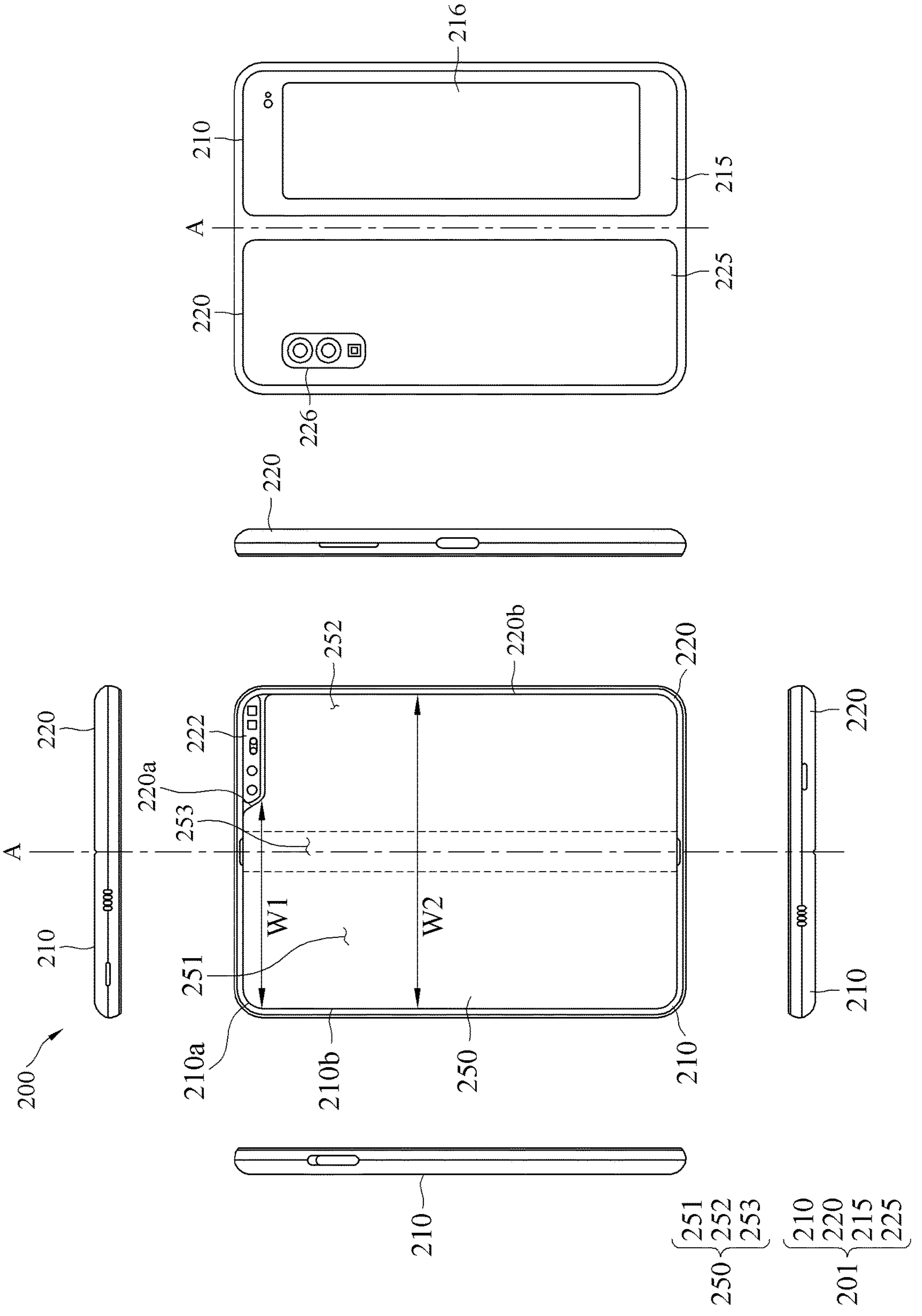
FIG. 2 is a view of an electronic device in an unfolded state according to various example embodiments.
Figure 3:
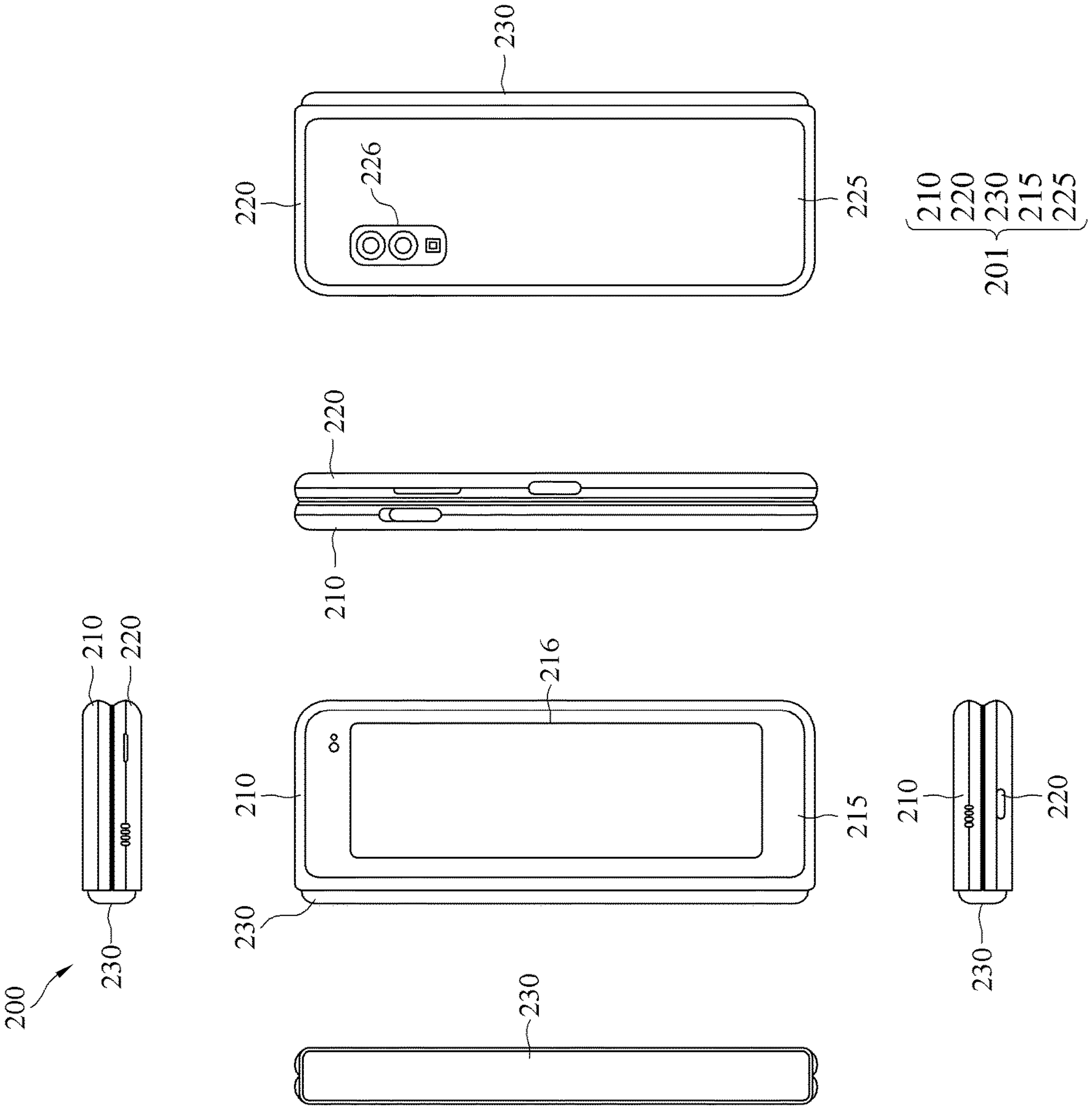
FIG. 3 is a view of an electronic device in a folded state according to various example embodiments.
Figure 4A:
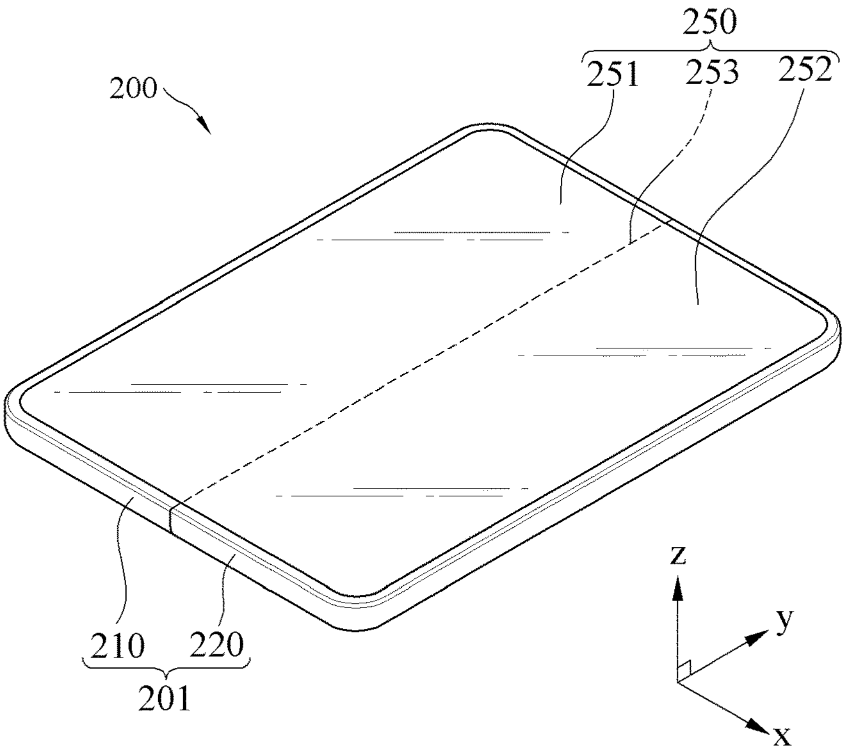
FIGS. 4A and 4B are perspective views of an electronic device in a fully unfolded state and a partially unfolded state (or an intermediate state) according to various example embodiments.
Figure 4B:
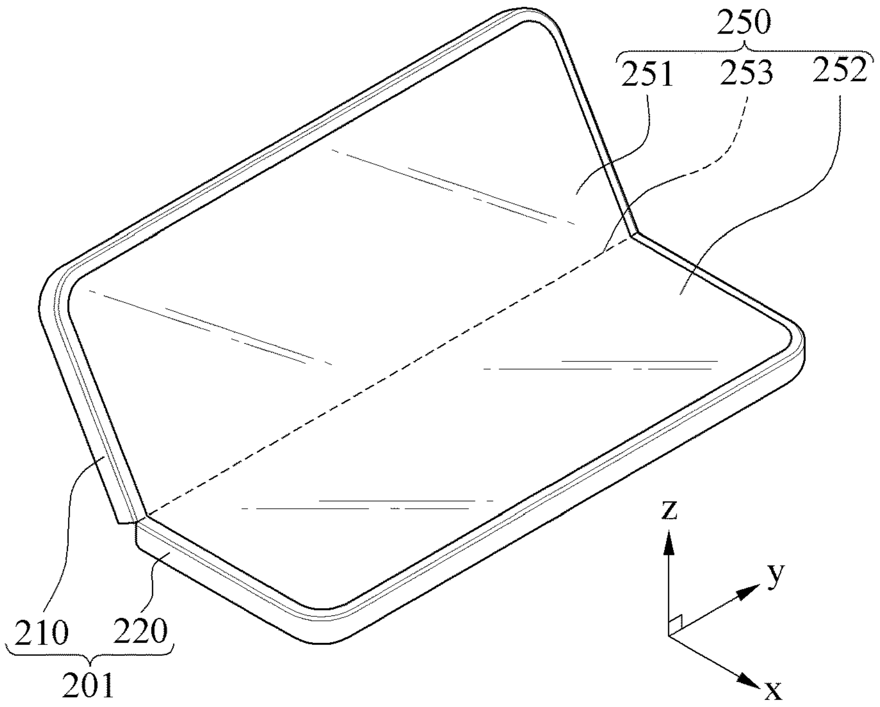

FIG. 2 is a view of an electronic device in an unfolded state according to various example embodiments. FIG. 3 is a view of an electronic device in a folded state according to various example embodiments. FIGS. 4A and 4B are perspective views of an electronic device in a fully unfolded state and a partially unfolded state (or an intermediate state) according to various example embodiments.

Referring to FIGS. 2, 3, and 4A and 4B, an electronic device 200, which is provided as an example of the electronic device 101 of FIG. 1, may be a foldable or bendable electronic device.

In FIGS. 4A and 4B, and other following drawings, illustrated is a spatial coordinate system defined by an X axis, a Y axis, and a Z axis that are orthogonal to each other. The X axis indicates a width direction of an electronic device, the Y axis indicates a longitudinal direction of the electronic device, and the Z axis indicates a height (or thickness) direction of the electronic device. In the following description, a first direction may indicate a direction parallel to the Z axis.

Referring to FIGS. 2 and 3, according to an example embodiment, the electronic device 200 may include a foldable housing 201, and a flexible or foldable display 250 (hereinafter simply referred to as the "display" 250) (e.g., the display module 160 of FIG. 1) disposed in a space formed by the foldable housing 201. A surface on which the display 250 is disposed (or a surface on which the display 250 is viewed from the outside of the electronic device 200) is referred to herein as a front surface of the electronic device 200. In addition, a surface opposite to the front surface is referred to herein as a rear surface of the electronic device 200. In addition, a surface surrounding a space between the front surface and the rear surface is referred to herein as a side surface of the electronic device 200.

The foldable housing 201 may include a first housing structure 210, a second housing structure 220 including a sensor area 222, a first rear surface cover 215, a second rear surface cover 225, and a hinge structure 230. The hinge structure 230 may include a hinge cover that covers a foldable portion of the foldable housing 201. However, the foldable housing 201 of the electronic device 200 is not limited to the shape and connection illustrated in FIGS. 2 and 3, but may be implemented to have another shape or through a combination and/or connection of components or parts. For example, the first housing structure 210 and the first rear surface cover 215 may be integrated, and the second housing structure 220 and the second rear surface cover 225 may be integrated.

The first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

The first surface and the third surface may meet when the electronic device 200 is in a fully folded state (i.e., a state in which the electronic device 200 is fully folded), and the third direction and the first direction are the same when the electronic device 200 is in a fully unfolded state (i.e., a state in which the electronic device 200 is fully unfolded).

The first housing structure 210 and the second housing structure 220 may be disposed on both sides with respect to a folding axis A, and may be overall symmetrical with respect to the folding axis A. As to be described later, an angle or distance between the first housing structure 210 and the second housing structure 220 may vary according to whether the state of the electronic device 200 is the unfolded state, the folded state, or a partially unfolded or folded state (or an intermediate state). Unlike the first housing structure 210, the second housing structure 220 may additionally include the sensor area 222 in which various sensors are disposed. However, apart from such an area, the first housing structure 210 and the second housing structure 220 may be symmetrical in other areas.

As illustrated in FIG. 2, the first housing structure 210 and the second housing structure 220 may together form a recess that accommodates therein the display 250. Due to the sensor area 222, the recess may have at least two different widths in a direction perpendicular to the folding axis A. For example, the recess may have a first width w1 between a first portion 210*a* of the first housing structure 210 parallel to the folding axis A and a first portion 220*a* of the second housing structure 220 formed on a periphery of the sensor area 222, and a second width w2 formed by a second portion 210*b* of the first housing structure 210 and a second portion 220*b* of the second housing structure 220 that is not the sensor area 222 and is parallel to the folding axis A. In this example, the second width w2 may be greater than the first width w1. The first portion 220*a* and the second portion 220*b* of the second housing structure 220 may be at different distances from the folding axis A. However, the width of the recess is not limited to the example widths. For example, the recess may have a plurality of widths according to the shape of the sensor area 222 or an asymmetrical portion of the first housing structure 210 and the second housing structure 220. The sensor area 222 may be formed to have a predetermined area adjacent to one corner of the second housing structure 220. However, the arrangement, shape, and size of the sensor area 222 are not limited to the illustrated example. For another example, the sensor area 222 may be provided at another corner of the second housing structure 220 or in an area between an upper corner and a lower corner. Components embedded in the electronic device 200 to perform various functions may be exposed to the front surface of the electronic device 200 through the sensor area 222 or through one or more openings provided in the sensor area 222. The components may include various types of sensors. The sensors may include, for example, at least one of a front camera, a receiver, or a proximity sensor. According to other example embodiments, the sensor area 222 may not be included in the second housing structure 220 or may be formed at a position different from the illustrated position.

At least a portion of the first housing structure 210 and the second housing structure 220 may be formed of a metal material or non-metal material having rigidity of a selected magnitude to support the display 250. The portion formed of the metal material may provide a ground plane for the electronic device 200, and may be electrically connected to a ground line formed on a printed circuit board (PCB) disposed inside the foldable housing 201.

The first rear surface cover 215 may be disposed on one side of the folding axis A on the rear surface of the electronic device 200, and may have, for example, a substantially rectangular periphery that is surrounded by the first housing structure 210. Similarly, the second rear surface cover 225 may be disposed on the other side of the folding axis A on the rear surface of the electronic device 200, and may have a periphery that is surrounded by the second housing structure 220.

The first rear surface cover 215 and the second rear surface cover 225 may be substantially symmetrical with respect to the folding axis A. However, the first rear surface cover 215 and the second rear surface cover 225 are not necessarily symmetrical, but the electronic device 200 may include a first rear surface cover and a second rear surface cover of various shapes. According to another example embodiment, the first rear surface cover 215 may be integrated with the first housing structure 210, and the second rear surface cover 225 may be integrated with the second housing structure 220.

The first rear surface cover 215, the second rear surface cover 225, the first housing structure 210, and the second housing structure 220 may form a space in which various components (e.g., a PCB or a battery) of the electronic device 200 are disposed. According to an example embodiment, one or more components may be disposed or visually exposed on the rear surface of the electronic device 200. For example, at least a portion of a sub-display may be visually exposed through a first rear area 216 of the first rear surface cover 215. According to another example embodiment, one or more components or sensors may be visually exposed through a second rear area 226 of the second rear surface cover 225. The sensors may include a proximity sensor and/or a rear camera.

A front camera exposed to the front surface of the electronic device 200 through one or more openings provided in the sensor area 222 or a rear camera exposed through the second rear area 226 of the second rear surface cover 225 may include one or more lenses, an image sensor, and/or an image signal processor (ISP). A flash may include, for example, a light-emitting diode (LED) or a xenon lamp. According to some example embodiments, two or more lenses (infrared (IR) camera, and wide-angle and telephoto lenses) and image sensors may be disposed on one surface of the electronic device 100.

Referring to FIG. 3, the hinge cover may be disposed between the first housing structure 210 and the second housing structure 220 to cover internal components (e.g., the hinge structure 230). The hinge structure 230 may be covered by a portion of the first housing structure 210 and the second housing structure 220, or may be exposed to the outside, according to the state of the electronic device 200 (e.g., the unfolded state, the intermediate state, or the folded state).

For example, when the electronic device 200 is in the unfolded state (e.g., the fully unfolded state) as illustrated in FIG. 2, the hinge structure 230 may be covered by the first housing structure 210 and the second housing structure 220 not to be exposed. For another example, when the electronic device 200 is in the folded state (e.g., the fully folded state) as illustrated in FIG. 3, the hinge structure 230 may be exposed to the outside, being between the first housing structure 210 and the second housing structure 220. For still another example, when the electronic device 200 is in the intermediate state with a certain angle formed between the first housing structure 210 and the second housing structure 220, the hinge structure 230 may be partially exposed to the outside, being between the first housing structure 210 and the second housing structure 220. In this example, an exposed area may be smaller than an area exposed in the fully folded state. The hinge structure 230 may include a curved surface.

The display 250 may be disposed in a space formed by the foldable housing 201. For example, the display 250 may be seated on the recess formed by the foldable housing 201 and be viewed from the outside through the front surface of the electronic device 200. For example, the display 250 may form a most portion of the front surface of the electronic device 200. Accordingly, the front surface of the electronic device 200 may include the display 250, and a partial area of the first housing structure 210 and a partial area of the second housing structure 220 that are adjacent to the display 250. In addition, the rear surface of the electronic device 200 may include the first rear surface cover 215, a partial area of the first housing structure 210 adjacent to the first rear surface cover 215, the second rear surface cover 225, and a partial area of the second housing structure 220 adjacent to the second rear surface cover 225.

The display 250 may be a display of which at least one area is deformable into a planar surface or a curved surface. The display 250 may include a folding area 253, a first area 251 disposed on one side of the folding area 253 (e.g., on the left side of the folding area 253 in FIG. 2), and a second area 252 disposed on the other side of the folding area 253 (e.g., on the right side of the folding area 253 in FIG. 2).

However, such an area division of the display 250 as illustrated in FIG. 2 is provided merely as an example, and the display 250 may be divided into a plurality of areas (e.g., two areas or four or more areas) according to a structure or functions thereof. For example, as illustrated in FIG. 2, the display 250 may be divided into areas based on the folding area 253 extending in parallel to the folding axis A. For another example, the display 250 may be divided into areas based on another folding axis (e.g., a folding axis parallel to the width direction of the electronic device 200).

The display 250 may be combined with or disposed adjacent to a touch panel including a touch sensing circuit and a pressure sensor configured to measure the intensity (or pressure) of a touch. For example, for the touch panel, the display 250 may be coupled to or disposed adjacent to the touch panel for detecting a stylus pen of an electromagnetic resonance (EMR) type.

The first area 251 and the second area 252 may be overall symmetrical with respect to the folding area 253. Unlike the first area 251, the second area 252 may include a notch cut according to the presence of the sensor area 222, but may be symmetrical to the first area 251 in the other areas except for such an area. That is, the first area 251 and the second area 252 may include mutually symmetrical portions and mutually asymmetrical portions.

The first area 251 and the second area 252 may each have an edge thickness different from an edge thickness of the folding area 253. The edge thickness of the folding area 253 may be less than the edge thickness of the first area 251 and the second area 252. For example, when cross-sectionally viewed, the first area 251 and the second area 252 may be asymmetrical in terms of thickness. For example, an edge of the first area 251 may be formed to have a first radius of curvature, and an edge of the second area 252 may be formed to have a second radius of curvature different from the first radius of curvature. For another example, when cross-sectionally viewed, the first area 251 and the second area 252 may be symmetrical in terms of thickness.

Hereinafter, each area of the display 250 and operations of the first housing structure 210 and the second housing structure 220 will be described in relation to the state of the electronic device 200, for example, the folded state, the unfolded state, or the intermediate state.

When the electronic device 200 is in the unfolded state as illustrated in FIG. 2, the first housing structure 210 and the second housing structure 220 may be disposed to face the same direction with an angle of 180° formed therebetween. The surfaces of the first area 251 and the second area 252 of the display 250 may form the angle of 180° and face the same direction (e.g., a direction of the front surface of the electronic device 200). The folding area 253 may form the same plane along with the first area 251 and the second area 252.

When the electronic device 200 is in the folded state as illustrated in FIG. 3, the first housing structure 210 and the second housing structure 220 may be disposed to face each other. The surfaces of the first area 251 and the second area 252 of the display 250 may face each other with a narrow angle (e.g., an angle between 0° and 10°) formed therebetween. In this case, the folding area 253 may be formed to have a curved surface having a predetermined curvature, in at least a portion thereof.

When the electronic device 200 is in the intermediate state, the first housing structure 210 and the second housing structure 220 may be disposed with a certain angle therebetween. The surfaces of the first area 251 and the second area 252 of the display 250 may form an angle that is greater than an angle formed therebetween in the folded state and less than an angle formed therebetween in the unfolded state. In this case, the folding area 253 may be formed to have a curved surface having a predetermined curvature, in at least a portion thereof. The curvature may be less than that formed in the folded state.

FIG. 4A is a perspective view of an electronic device in a fully unfolded state according to various example embodiments, and 4B is a perspective view of an electronic device in a partially unfolded state (or an intermediate state) according to various example embodiments. As described above, a state of the electronic device 200 may be changed to a folded state or an unfolded state, for example. When viewed in a direction of a folding axis (e.g., an A-axis in FIG. 2), the electronic device 200 may be folded in two manners-in-folding allowing the front surface of the electronic device 200 to form an acute angle and out-folding allowing the front surface of the electronic device 200 to form an obtuse angle. That is, the electronic device 200 of a foldable type may be classified into an in-folding type device that is folded through the in-folding and an out-folding type device that is folded through the out-folding. For example, when the electronic device 200 is in a state in which the electronic device 200 is folded through the in-folding, the first surface of the first housing structure 210 and the third surface of the second housing structure 220 may meet (or face) each other. When the electronic device 200 is a fully unfolded state, the first surface of the first housing structure 210 and the third surface of the second housing structure 220 may face the same direction (e.g., a direction parallel to a Z-axis).

For example, when the electronic device 200 is in a state in which the electronic device 200 is folded through the out-folding, the second surface of the first housing structure 210 and the fourth surface of the second housing structure 220 may meet (or face) each other.

In addition, although not illustrated, the electronic device 200 may include a plurality of hinge axes (e.g., two parallel hinge axes including the A axis in FIG. 2 and another axis parallel to the A axis). In this case, the electronic device 200 may be folded through multi-folding which is a combination of the in-folding and the out-folding.

An in-folding type described herein may indicate a state in which the display 250 is not exposed to the outside in a fully folded state, and an out-folding type described herein may indicate a state in which the display 250 is exposed to the outside in the fully folded state. FIG. 4B illustrates the electronic device 200 that is partially unfolded in the process of the in-folding, for example, in an intermediate state.

Although the state in which the electronic device 200 is folded through the in-folding will be mainly described as an example hereinafter, the following description may also be applicable to the state in which the electronic device 200 is folded through the out-folding.

Figure 5A:
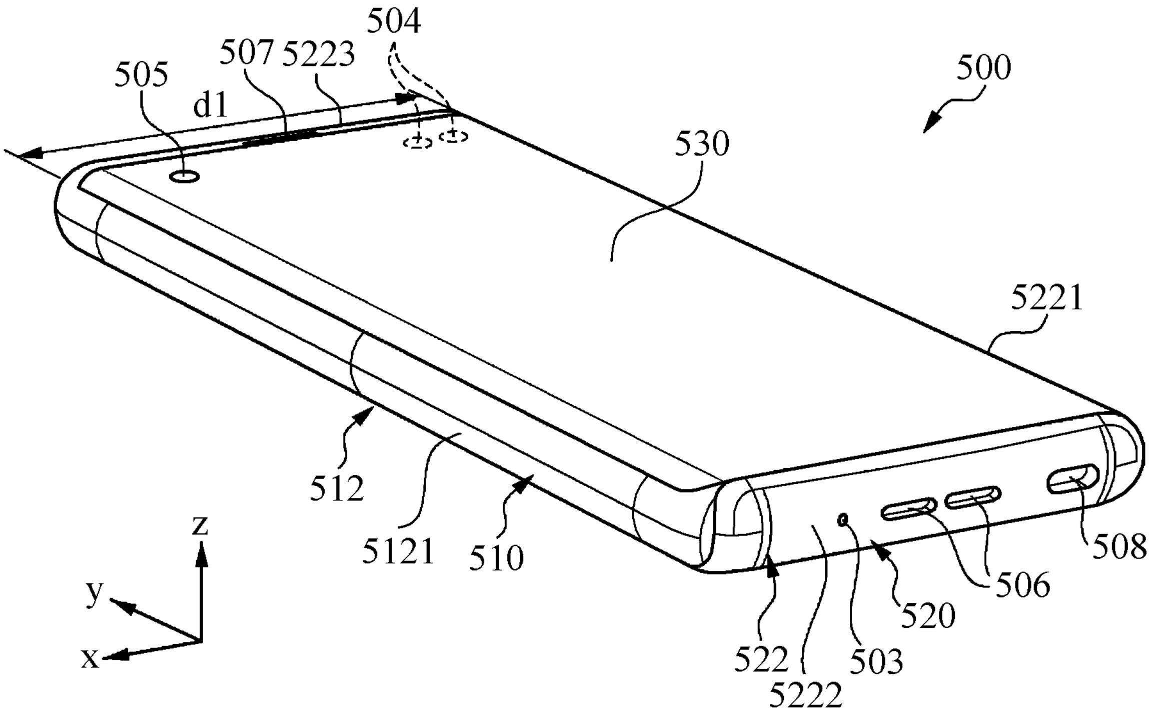
FIGS. 5A and 5B are front perspective views of an electronic device in a closed state and an open state according to various example embodiments.
Figure 5B:
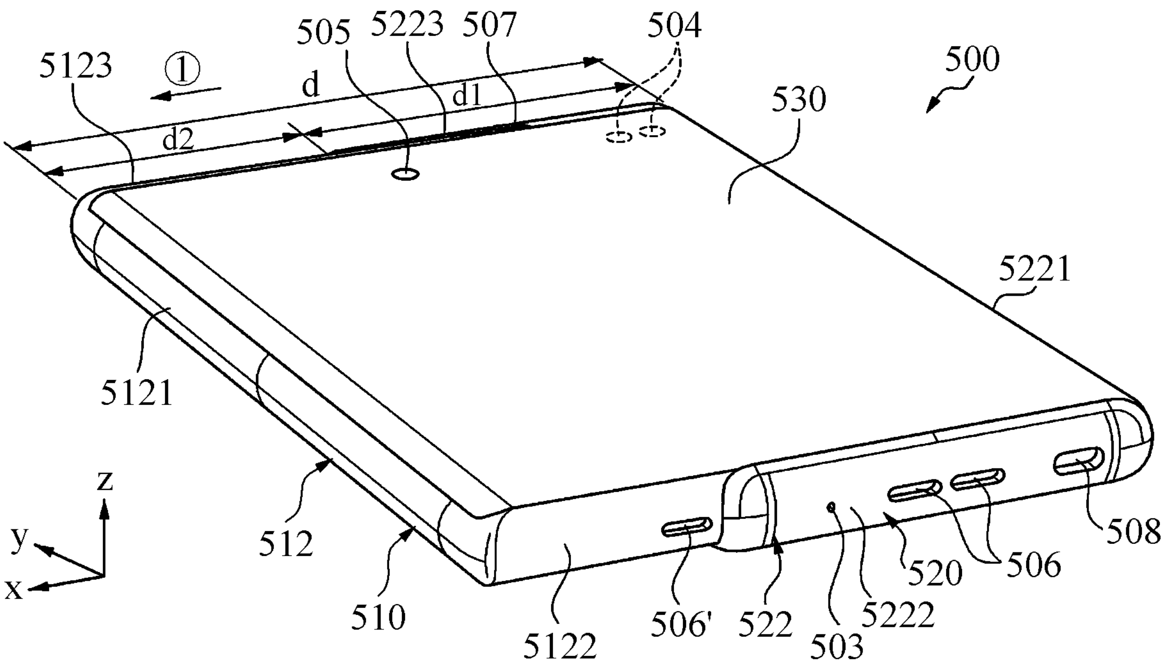
Figure 6A:
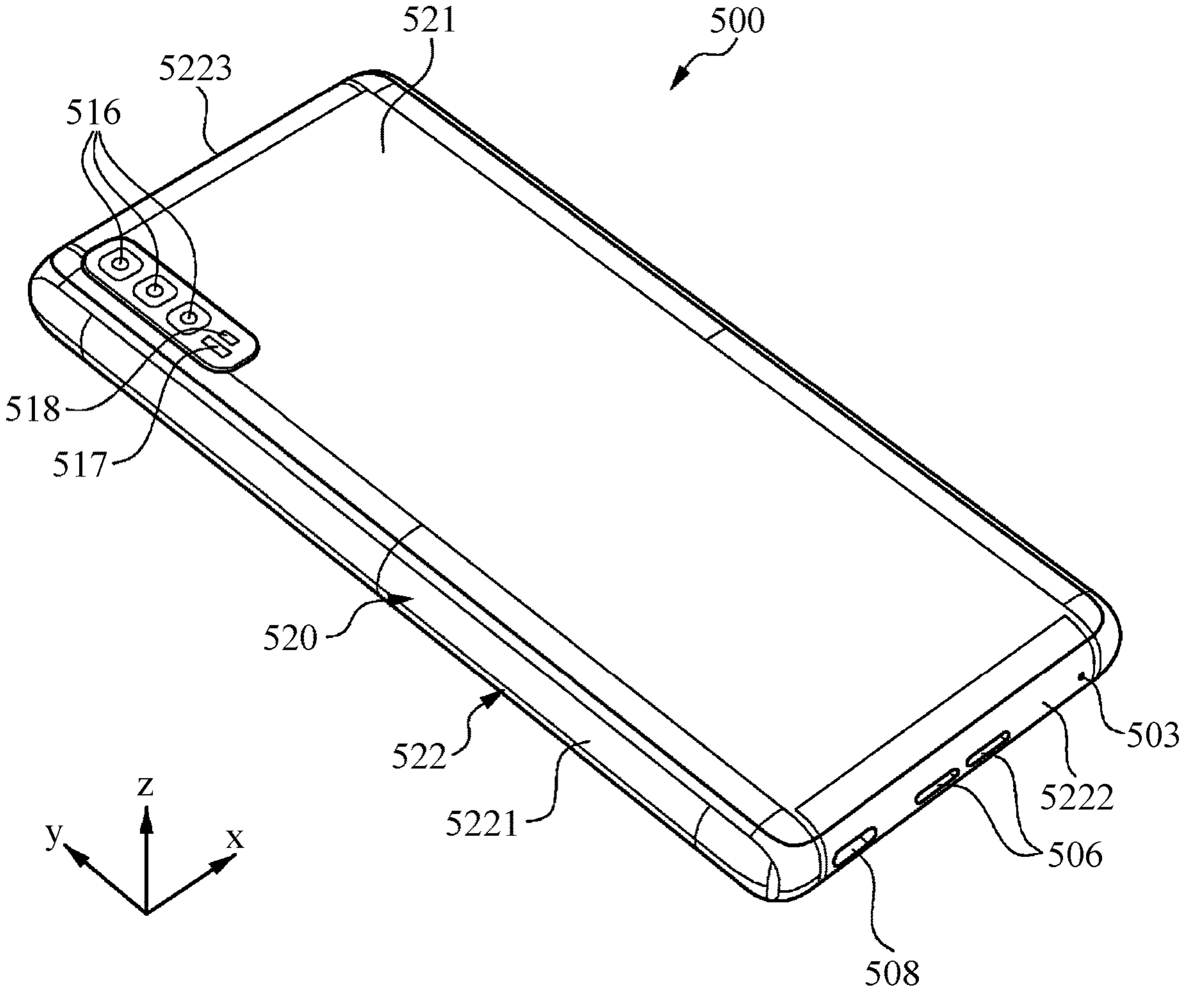
FIGS. 6A and 6B are rear perspective views of an electronic device in a closed state and an open state according to various example embodiments.
Figure 6B:
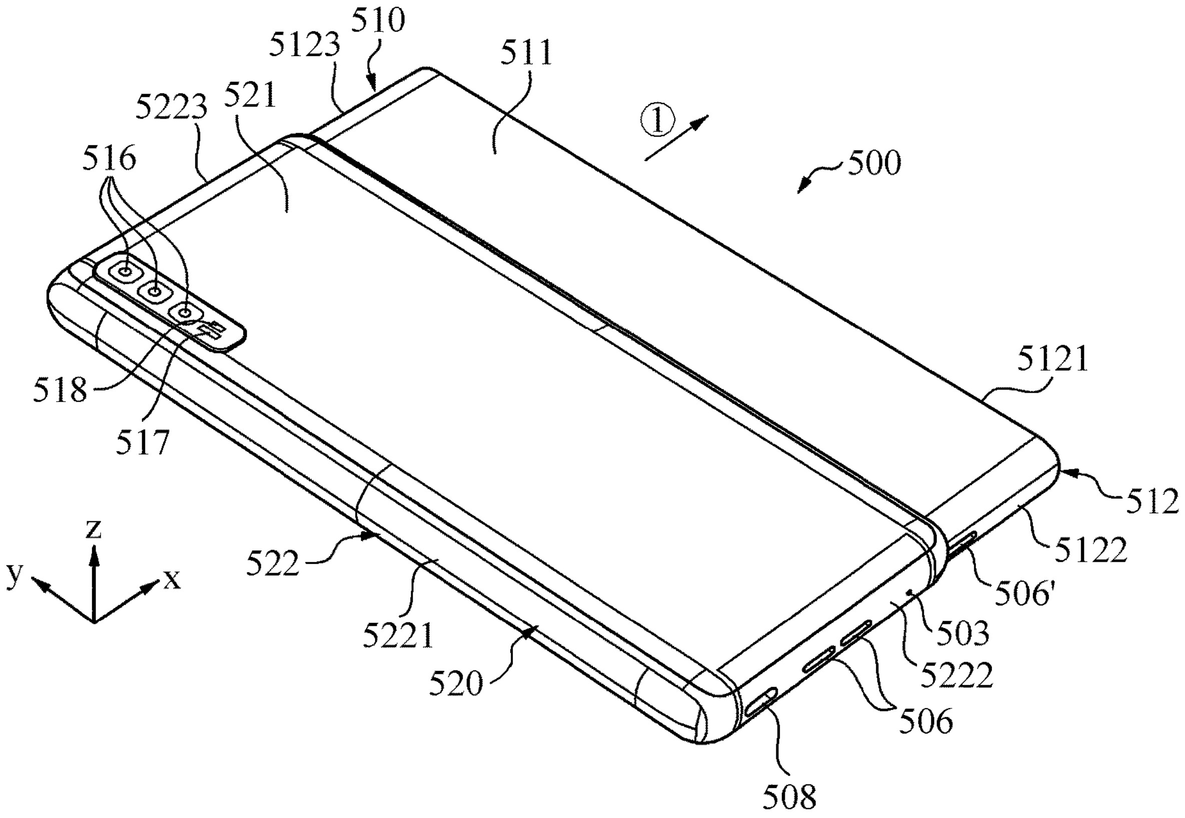

FIGS. 5A and 5B are front perspective views of an electronic device in a closed state and an open state according to various example embodiments. FIGS. 6A and 6B are rear perspective views of an electronic device in a closed state and an open state according to various example embodiments.

According to an example embodiment, an electronic device 500 illustrated in FIG. 5A may be at least partially similar to the electronic device 101 of FIG. 1 or may further include other components.

Referring to FIGS. 5A and 5B, and 6A and 6B, the electronic device 500 may include a first housing 510 and a second housing 520 that is at least partially movably connected to the first housing 510. The first housing 510 may include a first plate 511 and a first side frame 512 extending in substantially a perpendicular direction (e.g., a Z-axis direction) along an edge of the first plate 511. The first side frame 512 may include a first side surface 5121, a second side surface 5122 extending from one end of the first side surface 5121, and a third side surface 5123 extending from the other end of the first side surface 5121. The first housing 510 may include a first space that is at least partially closed from the outside through the first plate 511 and the first side frame 512.

The second housing 520 may include a second plate 521 and a second side frame 522 extending in substantially a perpendicular direction (e.g., the Z-axis direction) along an edge of the second plate 521. The second side frame 522 may include a fourth side surface 5221 facing a direction opposite to the first side surface 5121, a fifth side surface 5222 extending from one end of the fourth side surface 5221 and at least partially connected to the second side surface 5122, and a sixth side surface 5223 extending from the other end of the fourth side surface 5221 and at least partially connected to the third side surface 5123. For another example, the fourth side surface 5221 may extend from another structure that is not the second plate 521 and be connected to the second plate 521. The second housing 520 may include a second space that is at least partially closed from the outside through the second plate 521 and the second side frame 522. The first plate 511 and the second plate 521 may be disposed to form at least partially a rear surface of the electronic device 500. The first plate 511, the second plate 521, the first side frame 512, and the second side frame 522 may be formed of, for example, a polymer, coated or tinted glass, ceramic, metal (e.g., aluminum, stainless steel (STS), or magnesium), or a combination of at least two of the foregoing materials.

The electronic device 500 may include a flexible display 530 disposed to be supported by the first housing 510 and the second housing 520. The flexible display 530 may include a flat portion supported by the second housing 520 and a bendable portion extending from the flat portion and supported by the first housing 510. The bendable portion of the flexible display 530 may be disposed so as not to be exposed to the outside in the first space of the first housing 510 while the electronic device 500 is in the closed state, and may be exposed to the outside to extend from the flat portion while being supported by the first housing 510 while the electronic device 500 is in the open state. Thus, the electronic device 500 may be a rollable device of which a display screen of the flexible display 530 is expandable by an opening operation performed by a movement of the first housing 510 from the second housing 520.

The first housing 510 of the electronic device 500 may be at least partially inserted into the second space of the second housing 520, and be movably connected thereto in a direction indicated as (1). For example, in the closed state of the electronic device 500, a state in which the first housing 510 and the second housing 520 are connected such that the first side surface 5121 and the fourth side surface 5221 have a first distance d1 may be maintained. In the open state of the electronic device 500, a state in which the first housing 510 protrudes from the second housing 520 such that the first side surface 5121 protrudes from the fourth side surface 5221 by a predetermined distance d2 may be maintained. In the open state, the flexible display 530 may be supported by the first housing 510 and/or the second housing 520 such that both ends have a curved edge.

A state of the electronic device 500 may be changed to the open state and the closed state automatically through a driving unit disposed in the first space and/or the second space. For example, when detecting an event for the change to the open/closed state, a processor (e.g., the processor 120 of FIG. 1) of the electronic device 500 may control an operation of the first housing 510 through the driving unit. For another example, the first housing 510 may manually protrude from the second housing 520 by an operation performed by a user. In this example, the first housing 510 may protrude by an amount desired by the user, which may allow a screen of the flexible display 530 to vary to have various sizes of a displaying area. Thus, the processor of the electronic device 500 may display an object in various ways and control an application program to be executed, according to a size of the displaying area corresponding to a predetermined amount of protrusion of the first housing 510.

The electronic device 500 may include at least one of an input module 503, sound output modules 506 and 507, sensor modules 504 and 517, camera modules 505 and 516, a connector port 508, a key input device (not shown), or an indicator (not shown). For another example, the electronic device 500 may not include at least one of the foregoing components or may additionally include other components.

The input module 503 may include a microphone, for example. For another example, the input module 503 may include a plurality of microphones disposed to sense directions of sound. The sound output modules 506 and 507 may include speakers. For example, the speakers may include an external speaker (e.g., 506) and a receiver (e.g., 507) for calls. For another example, when an external speaker 506' is disposed in the first housing 510, it may be configured such that sound is output through a speaker hole (e.g., 506) formed in the second housing 520 in the closed state. The microphone or the connector port 508 may be formed to have substantially the same configuration. For another example, the sound output modules 506 and 507 may include a speaker (e.g., a piezoelectric speaker) operating with a separate speaker hole excluded.

The sensor modules 504 and 517 may generate an electrical signal or a data value corresponding to an internal operation state or an external environment state of the electronic device 500. The sensor modules 504 and 517 may include, for example, a first sensor module 504 (e.g., a proximity sensor or an illuminance sensor) disposed on the front surface of the second housing 520 and/or a second sensor module 517 (e.g., a heart rate monitor (HRM)) disposed on the rear surface of the second housing 520. The first module 504 may be disposed under the flexible display 530 in the second housing 520. The first sensor module 504 may further include, for example, at least one of a proximity sensor, an illuminance sensor, a time of flight (TOF) sensor, an ultrasonic sensor, a fingerprint sensor, a gesture sensor, a gyro sensor, a barometric pressure sensor, a magnetic sensor, an acceleration sensor, a grip sensor, a color sensor, an IR sensor, a biosensor, a temperature sensor, or a humidity sensor.

The camera modules 505 and 516 may include a first camera module 505 disposed on the front surface of the second housing 520 of the electronic device 500 and a second camera module 516 disposed on the rear surface of the second housing 520. The electronic device 500 may include a flash 518 disposed around the second camera module 516. The camera modules 505 and 516 ma include a single lens or a plurality of lenses, an image sensor, and/or an image signal processor (ISP). The first camera module 505 may be disposed under the flexible display 530 and configured to capture an image of an object through an activated area or a portion of the flexible display 530. The flash 518 may include an LED or a xenon lamp, for example. According to some example embodiments, two or more lenses (wide-angle and telephoto lenses) and image sensors may be disposed on one surface of the electronic device 500.

The electronic device 500 may include at least one antenna (not shown). For example, the antenna may wirelessly communicate with an external electronic device (e.g., the electronic device 104 of FIG. 1), or wirelessly transmit or receive power required for charging. The antenna may include, for example, a legacy antenna, an mmWave antenna, a near-field communication (NFC) antenna, a wireless charging antenna, and/or a magnetic secure transmission (MST) antenna. According to another example embodiment, an antenna structure may be formed with at least a portion of the first side frame 512 and/or the second side frame 522 that is formed of metal.

Figure 7:
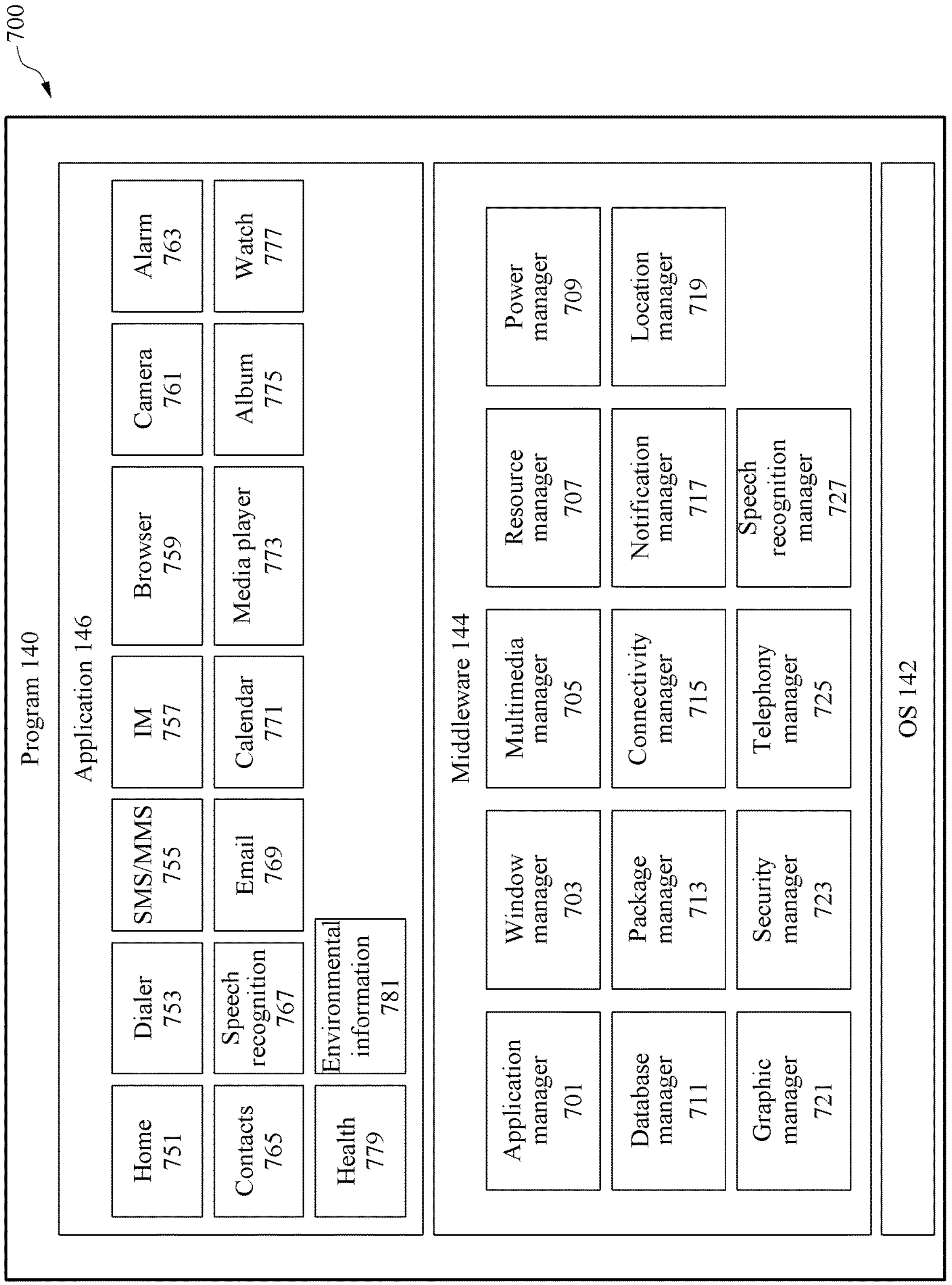
FIG. 7 is a block diagram illustrating an example program according to various example embodiments.

FIG. 7 is a block diagram illustrating an example program according to various example embodiments.

Referring to FIG. 7, a block diagram 700 illustrates a program 140. According to an example embodiment, the program 140 may include an operating system (OS) 142 for controlling one or more resources of an electronic device 101, a middleware 144, or an application 146 executable in the OS 142. The OS 142 may include, for example, Android™ iOS™, Windows™, Symbian™, Tizen™, or Bada™. At least some of the programs 140 may be preloaded in the electronic device 101 during the manufacture, or downloaded or updated from an external electronic device (e.g., the electronic device 102 or 104, or the server 108 of FIG. 1) when it is used by a user.

The OS 142 may control management (e.g., allocation or recovery) of one or more system resources (e.g., process, memory, or power supply) of the electronic device 101. The OS 142 may include, alternatively or additionally, one or more driver programs for driving or operating another hardware device of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that the application 146 uses functions or information provided by the one or more resources of the electronic device 101. The middleware 144 may include, for example, an application manager 701, a window manager 703, a multimedia manager 705, a resource manager 707, a power manager 709, a database (DB) manager 711, a package manager 713, a connectivity manager 715, a notification manager 717, a location manager 719, a graphics manager 721, a security manager 723, a telephony manager 725, or a speech recognition manager 727.

The application manager 701 may manage, for example, a life cycle of the application 146. The window manager 703 may manage, for example, one or more graphical user interface (GUI) resources used for a screen. The multimedia manager 705 may, for example, identify one or more formats required for playing media files, and encode or decode a media file among the media files using a codec corresponding to a selected format. The resource manager 707 may manage, for example, a source code of the application 146 or a memory space of the memory 130. The power manager 709 may manage, for example, capacity, temperature, or power of the battery 189, and determine or provide information necessary for operations of the electronic device 101 using corresponding information. The power manager 709 may interwork with a basic input/output system (BIOS) (not shown) of the electronic device 101.

The DB manager 711 may generate, retrieve, or change a DB to be used by the application 146. The package manager 713 may manage, for example, installation or update of an application distributed in the form of a package file. The connectivity manager 715 may manage, for example, a wireless or direct connection between the electronic device 101 and an external electronic device. The notification manager 717 may provide a function for notifying a user of an occurrence of a preset event (e.g., an incoming call, a message, or an alarm). The location manager 721 may manage, for example, one or more graphical effects and related user interfaces (UIs) to be provided to a user.

The security manager 723 may provide, for example, system security or user authentication. The telephony manager 725 may manage, for example, a voice call function or video call function provided by the electronic device 101. The speech recognition manager 727 may transmit voice data (or audio data) of a user to the server 108 and receive, from the server 108, a command corresponding to a function to be performed in the electronic device 101 based on at least a portion of the audio data or text data converted based on at least a portion of the audio data. The middleware 144 may dynamically delete some of the existing components or add new components. At least a portion of the middleware 144 may be included as a part of the OS 142 or implemented as separate software different from the OS 142.

The application 146 may include, for example, home 751, dialer 753, short message service (SMS)/multimedia messaging service (MMS) 755, instant messaging (IM) 757, browser 759, camera 761, alarm 763, contacts 765, speech recognition 767, email 769, calendar 771, media player 773, album 775, watch 777, health 779 (e.g., measurements of bio-information including, for example, an amount of physical motion or blood sugar), or environmental information 781 (e.g., measurements of atmospheric pressure, a humidity, or a temperature) applications. The application 146 may further include an information exchange application (not shown) for supporting information exchange between the electronic device 101 and an external electronic device. The information exchange application may include, for example, a notification relay application set to transfer preset information (e.g., a call, a message, or an alarm) to an external electronic device, or a device management application set to manage an external electronic device. The notification relay application may transfer, to an external electronic device, notification information corresponding to a preset event (e.g., reception of a mail) occurring in another application (e.g., the email application 769) of the electronic device 101. Alternatively or additionally, the notification application may receive notification information from an external electronic device and provide the received notification information to a user of the electronic device 101.

The device management application may control a power supply (e.g., turning on/off) or functions (e.g., brightness, resolution, or focus) of an external electronic device communicating with the electronic device 101 or some components (e.g., a display module or a camera module) of the external electronic device. Alternatively or additionally, the device management application may support the installation, deletion, or updating of an application operating in an external electronic device.

Figure 8:
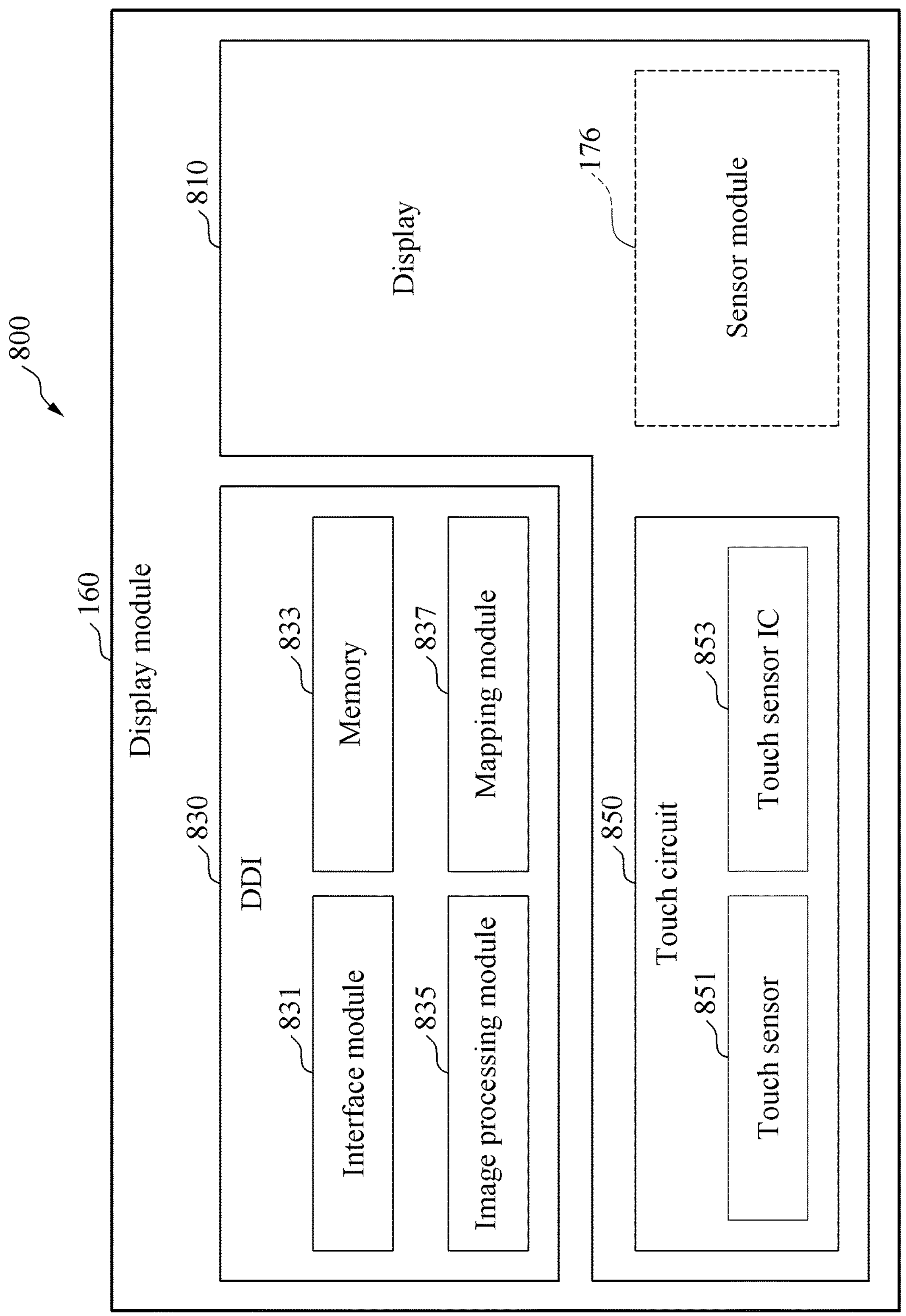
FIG. 8 is a block diagram illustrating an example display module according to various example embodiments.

FIG. 8 is a block diagram 800 illustrating an example of a display module according to various example embodiments.

Referring to FIG. 8, a display module 160 (e.g., the display module 160 of FIG. 1) may include a display 810 (e.g., the display 250 of FIG. 2) and a display driver integrated circuit (IC) (DDI) 830 configured to control the display 810. The DDI 830 may include an interface module 831, a memory 833 (e.g., a buffer memory), an image processing module 835, or a mapping module 837. For example, the DDI 830 may receive image data or image information including an image control signal corresponding to a command for controlling the image data from another component of an electronic device (e.g., the electronic device 101 of FIG. 1 or the electronic device 200 of FIGS. 2 through 4B) through the interface module 831. For example, the image information may be received from a main processor (e.g., the main processor 121 of FIG. 1 or application processor) or an auxiliary processor (e.g., the auxiliary processor 123 of FIG. 1 or a GPU) operated independently of functions of the main processor. The DDI 830 may communicate with a touch circuit 850 or a sensor module 176 (e.g., the sensor module 176 of FIG. 1) through the interface module 831. In addition, the DDI 830 may store at least a portion of the received image information in the memory 833 in a frame unit, for example. The image processing module 835 may perform pre-processing or post-processing (e.g., resolution, brightness, or size adjustment) on at least a portion of the image data based on at least one of a characteristic of the image data or a characteristic of the display 810. The mapping module 837 may generate a voltage or current value corresponding to the image data obtained through the pre-processing or the post-processing performed through the image processing module 835. For example, the generation of the voltage or current value may be performed based on at least a portion of the characteristics of pixels (e.g., an arrangement (red, green, blue [RGB] stripe or pentile structure) of the pixels, or a size of each sub-pixel) of the display 810. As at least a portion of the pixels of the display 810 is operated based on at least a portion of the voltage or current value, visual information (e.g., text, image, or icon) corresponding to the image data may be displayed through the display 810.

The display module 160 may further include the touch circuit 850. The touch circuit 850 may include a touch sensor 851 and a touch sensor IC 853 configured to control the touch sensor 851. For example, the touch sensor IC 853 may control the touch sensor 851 to sense a touch input or a hovering input at a specific point on the display 810. In this example, the touch sensor IC 853 may sense the touch input or the hovering input by measuring a change in a signal (e.g., voltage, intensity of light, resistance, or quantity of electric charges) at a specific point on the display 810. The touch sensor IC 853 may provide a processor (e.g., the processor 120 of FIG. 1) with information (e.g., position, size, pressure, or time) associated with the sensed touch input or hovering input. At least a portion of the touch circuit 850 (e.g., the touch sensor IC 853) may be included as a portion of the DDI 830 or the display 810, or as a portion of another component (e.g., the auxiliary processor 123) disposed outside the display module 160.

The display module 160 may further include at least one sensor (e.g., a fingerprint sensor, an iris sensor, a pressure sensor, and an illuminance sensor) of the sensor module 176, or a control circuit for the sensor. In this case, the sensor or the control circuit may be embedded in a portion (e.g., the display 810 or the DDI 830) of the display module 160 or a portion of the touch circuit 850. For example, when the sensor module 176 embedded in the display module 160 includes a biosensor (e.g., a fingerprint sensor), the biosensor may obtain bio-information (e.g., a fingerprint image) associated with a touch input through a partial region of the display 810. For another example, when the sensor module

176 embedded in the display module 160 includes a pressure sensor, the pressure sensor may obtain pressure information associated with a touch input through a partial or entire region of the display 810. The touch sensor 851 or the sensor module 176 may be arranged between pixels of a pixel layer of the display 810, or on or under the pixel layer.

Figure 9:
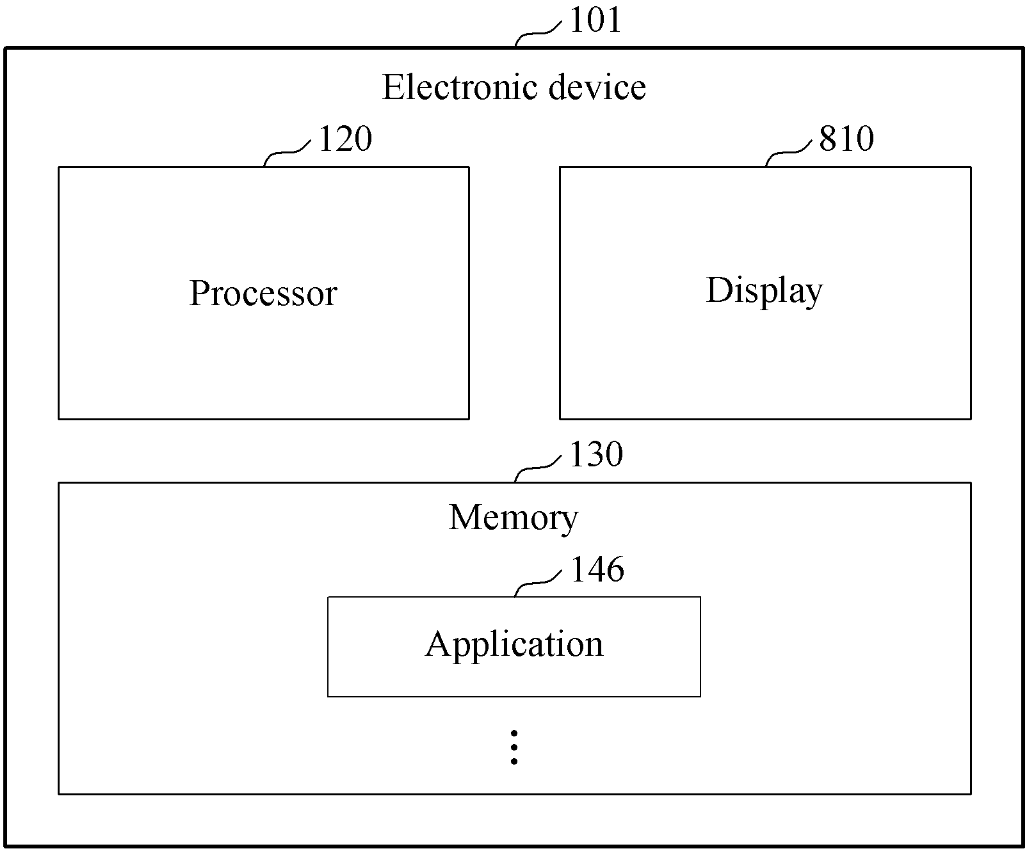
FIG. 9 is a diagram illustrating an example electronic device performing screen control according to various example embodiments.

FIG. 9 is a diagram illustrating an example electronic device performing screen control according to various example embodiments.

Referring to FIG. 9, an electronic device 101 may include a display 810, a memory 130, and a processor 120. For example, the electronic device 101 may correspond to the electronic device 101 of FIG. 1, the electronic device 200 of FIGS. 2 through 4B, or the electronic device 500 of FIGS. 5A through 6B. For example, the display 810 may correspond to the display module 160 of FIG. 1, the display 250 of FIG. 2, the display 250 of FIGS. 4A and 4B, the display 530 of FIG. 5A, the display 530 of FIG. 5B, or the display module 160 of FIG. 8. For example, the memory 130 may correspond to the memory 130 of FIG. 1. For example, the processor 120 may correspond to the processor 120 of FIG. 1.

The display 810 may output a screen, and the memory 130 may store therein at least one application (or app) 146. For example, the application 146 may correspond to the application 146 of FIG. 1 or the application 146 of FIG. 7. The processor 120 may be operatively connected to the display 810 and control the memory 130 to execute the application 146 stored in the memory 130 and control the screen displayed on the display 810.

The screen displayed on the display 810 of the electronic device 101 may include one or more windows. A window described herein may refer to a certain area in which information associated with the execution of functions of the electronic device 101 is output. The information may include various screen elements associated with the execution of the functions. The information may include at least one among various items such as, for example, a text, a still image, a moving image (or video), an icon, a virtual key button, a slide bar, a progress bar, a list item, and a thumbnail item.

The window may include an execution window of a program (e.g., the program 140 of FIG. 1 or the program 140 of FIG. 7) or the application 146 that is executed or run by the electronic device 101. The execution window of the application 146 may correspond to a certain area of the display 810 on which a screen output as the application 149 is executed on the electronic device 101 is displayed. Hereinafter, a window included in a screen displayed on the display 810 will be described as an example of an execution window of the application 146.

The execution window of the application 146 may include a host window corresponding to the application 146 and a dependent window corresponding to the application 146. The host window may be a main execution window that is determined in advance in association with running the application 146 and includes, for example, a window output by the execution of a root activity of the application 146, a window corresponding to an uppermost depth in a hierarchical structure of the application 146, and/or a window set to be output as a default when the application 146 is run.

The dependent window may be a window that is dependent on the host window. That the dependent window is dependent on the host window may be construed that the dependent window is called by an operation executed in the host window and displaying the dependent window is controlled by an operation executed in the host window. The operation executed in the host window may include an operation executed in response to an input from a user received by (or in) the host window. For example, the dependent window may include an execution window of the application 146 corresponding to a lower depth of the host window and/or an execution window of an external application connected to the host window. The external application may refer to an application corresponding to an identifier different from that of the application 146 and may be, for example, an application corresponding to a package different from that of the application 146.

For example, the dependent window that is dependent on the host window may be called by an input selecting an interfacing object included in the host window, and the called dependent window may be controlled to be displayed on a set region (e.g., a second region) of the display 810 that is determined in association with a region (e.g., a first region) on which the host window is displayed. The second region of the display 810 on which the dependent window is displayed may be determined in association with the first region of the display 810 on which the host display is displayed. For example, the second region may be determined to be a partial region in the first region or a region adjacent to the first region in the display 810, or be determined to be the same region as the first region.

The processor 120 may display, on the first region of the display 810, the host window corresponding to the application 146 runs on the electronic device 101. In response to an input received with respect to the host window, the processor 120 may call a first dependent window corresponding to the received input among dependent windows that are dependent on the host window. For example, the processor 120 may receive an input selecting the interfacing object included in the host window through the display 810, and call the first dependent window in response to the received input. The processor 120 may control the display 810 such that the called first dependent window is to be displayed on the second region determined in association with the first region.

As to be described hereinafter, the application 146 may include information associated with the first region and the second region that is determined based on a form factor structure of the electronic device 101 and/or a structure of the display 810 visually exposed based on the form factor structure. For example, the processor 120 may obtain the information associated with the first region determined based on the form factor structure of the electronic device 101 and/or the structure of the display 810 visually exposed based on the form factor structure, and display the host window on the first region of the display 810 based on the obtained information of the first region. In addition, the processor 120 may obtain the information associated with the second region determined based on the form factor structure of the electronic device 101 and/or the structure of the display 810 visually exposed based on the form factor structure, and display the first dependent window on the second region of the display 810 based on the obtained information of the second region.

According to an example embodiment, another dependent window that is called in the first dependent window displayed on the second region may be stacked and displayed on the second region. For example, an event occurring in the first dependent window displayed on the second region, a second dependent window that is dependent on the host window may be stacked and displayed on the second region. The event occurring in the first dependent window may include an event that calls another dependent window of the host window, for example, an event of receiving an input calling a dependent window corresponding to a lower depth of the first dependent window and/or an event of receiving an input calling an execution window of an external application connected to the first dependent window. That a dependent window is stacked and displayed on the second region may be construed that a dependent window previously displayed on the second region is displayed by being overlaid with a newly called dependent window.

Figure 10:
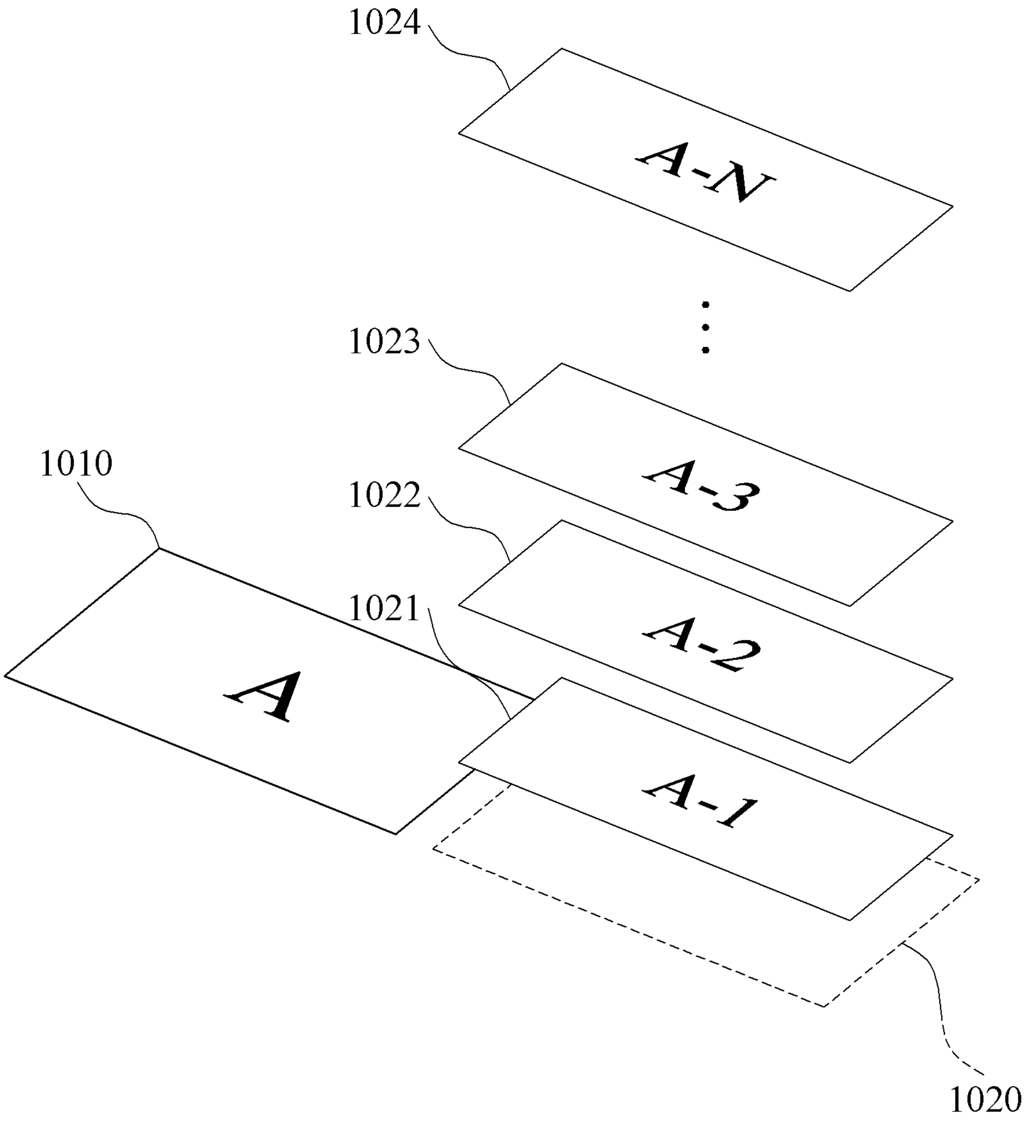
FIG. 10 is a diagram illustrating an example host window and an example dependent window according to various example embodiments.

For example, referring to FIG. 10, a host window may be displayed on a first region 1010 of the display 810, and dependent windows that are dependent on the host window may be displayed on a second region 1020 of the display 810. In this example, when a first dependent window 1021 is called first among the dependent windows and is then displayed on the second region 1020, a second dependent window 1022 may be called among the dependent windows based on an event occurring in the first dependent window 1021. The called second dependent window 1022 may be displayed on the second region 1020 by being overlaid on the first dependent window 1021. As the second dependent window 1022 is stacked and displayed on the second region 1020, the first dependent window 1021 may not be visually exposed on the display 810, and the first dependent window 102 may be inactivated or be executed in the background. Based on an event occurring in the second dependent window 1022, a third dependent window 1023 may be called, and the third dependent window 1023 may be stacked and displayed on the second region 1020. For example, when there is another dependent window of the host window to be called in a dependent window, the other dependent window may be called and the operation of stacking and displaying may be repeated for the other dependent window.

According to an example embodiment, a stacked structure of one or more dependent windows sequentially called for the application 146 may be stored in the memory 130. For example, referring to FIG. 10, when the dependent windows that are dependent on the host window are called in an order starting from the first dependent window 1021 to an nth dependent window 1024, a stacked structure of the dependent windows may be stored according to the order in which the dependent windows are called for the application 146. For example, the called dependent windows may be stored in a stack corresponding to the stacked structure. As to be described later, in response to a change in the size of the display 810 visually exposed based on the form factor structure of the electronic device 101, a stacked structure of dependent windows may be used to control displaying a host window and a dependent window(s) of the application 146 on the display 810.

Referring back to FIG. 9, the second region on which the dependent windows are stacked and displayed may be initialized based on an executed operation of the host window. For example, based on an event occurring in the host window, the processor 120 may initialize the window display on the second region based on the event occurring in the host window. The event occurring in the host window may include an event that is other than one calling a dependent window displayed on the second region from the host window, for example, an event of receiving an input changing a focus to another dependent window different from the dependent window displayed on the second region and/or an event of receiving an input canceling the call of the dependent window displayed on the second region. For example, the input changing the focus to the other dependent window different from the dependent window displayed on the second region may include an input selecting a second interfacing object different from a first interfacing object previously selected to call the dependent window stacked on the second region. The first interfacing object and the second interfacing object may be included in the host window.

That the window display on the second region is initialized may be construed that the execution of all the dependent windows stacked and displayed on the second region is terminated and the displaying of the windows displayed on the second region is all deleted. For example, when receiving an input selecting an interfacing object that is different from an interfacing object previously selected to call a dependent window stacked on the second region, the processor 120 may control the display 810 such that the displaying of the dependent window on the second region is deleted.

Figure 11:
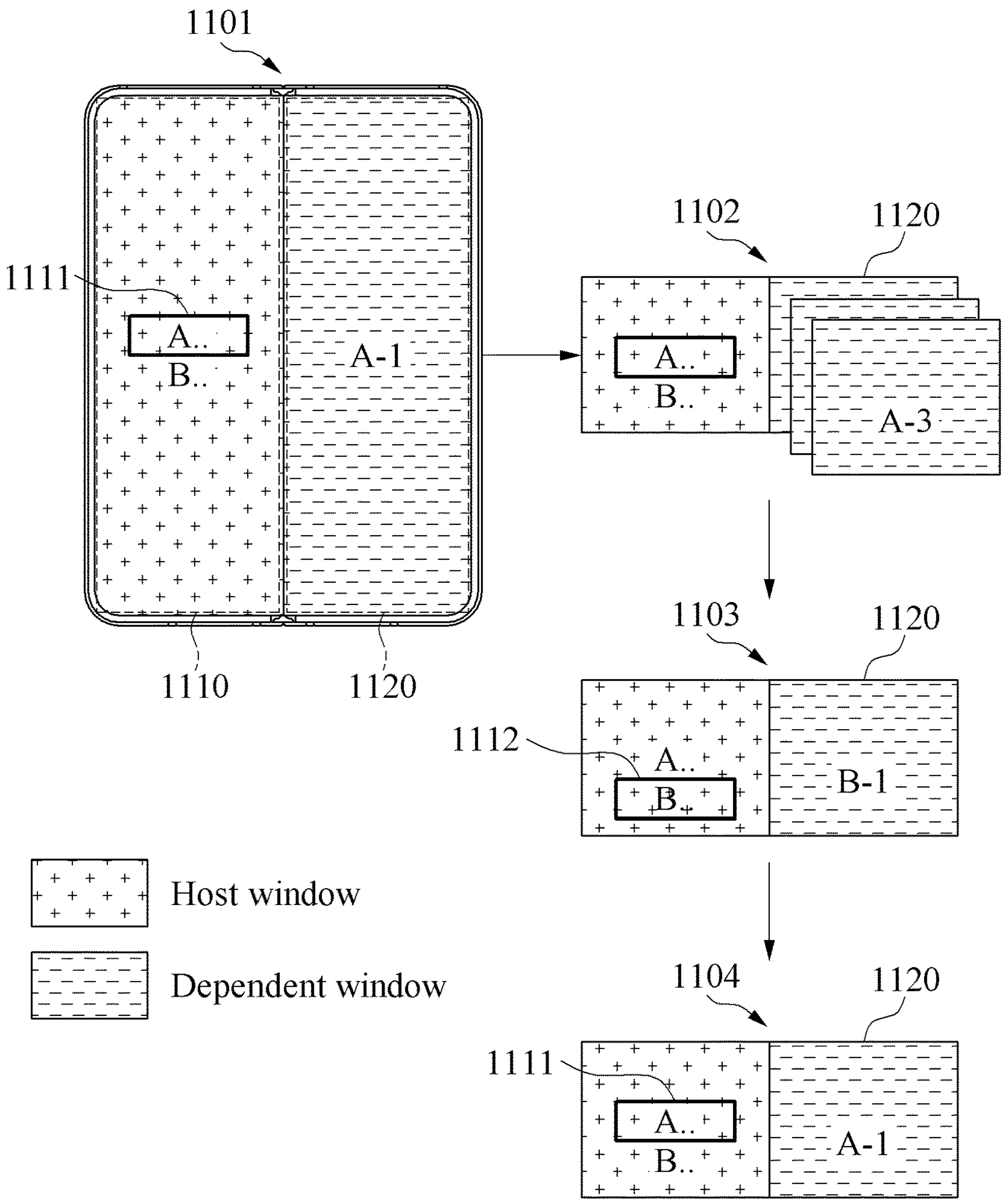
FIG. 11 is a diagram illustrating an example of controlling a region on which a dependent window is to be displayed based on an event occurring in a host window according to various example embodiments.

For example, referring to FIG. 11, in operation 1101, a host window may be displayed on a first region 1110 of a display, and a first dependent window may be called by an input selecting an interfacing object 1111 in the host window and be displayed on a second region 1120. In operation 1102, dependent windows called based on an event occurring in the first dependent window may be stacked and displayed on the second region 1120. Subsequently, in operation 1103, an event calling a second dependent window may occur by an input selecting an interfacing object 1112 in the host window, and window display on the second region 1120 may be initialized by the event occurring in the host window. The input selecting the interfacing object 1112 may correspond to an input calling the second dependent window that is different from the first dependent window stacked on the second region 1120 by the input selecting the interfacing object 1111 in operation 1101, and thus receiving the input selecting the interfacing object 1112 in operation 1103 may correspond to a focus change event occurring in the host window. In operation 1103, after the window display on the second region 1120 is initialized, the second dependent window that is newly called by the input selecting the interfacing object 1112 may be displayed on the second region 1120. When the input selecting the interfacing object 1111 for calling the first dependent window from the host window is received again, the window display on the second region 1120 may be initialized and the first dependent window may be called again. All dependent windows including the first dependent window stacked and displayed on the second region 1120 in operation 1102 may be initialized in operation 1103, and thus only the first dependent window may be displayed on the second region 1120 when the first dependent window is called again.

Figure 12A:
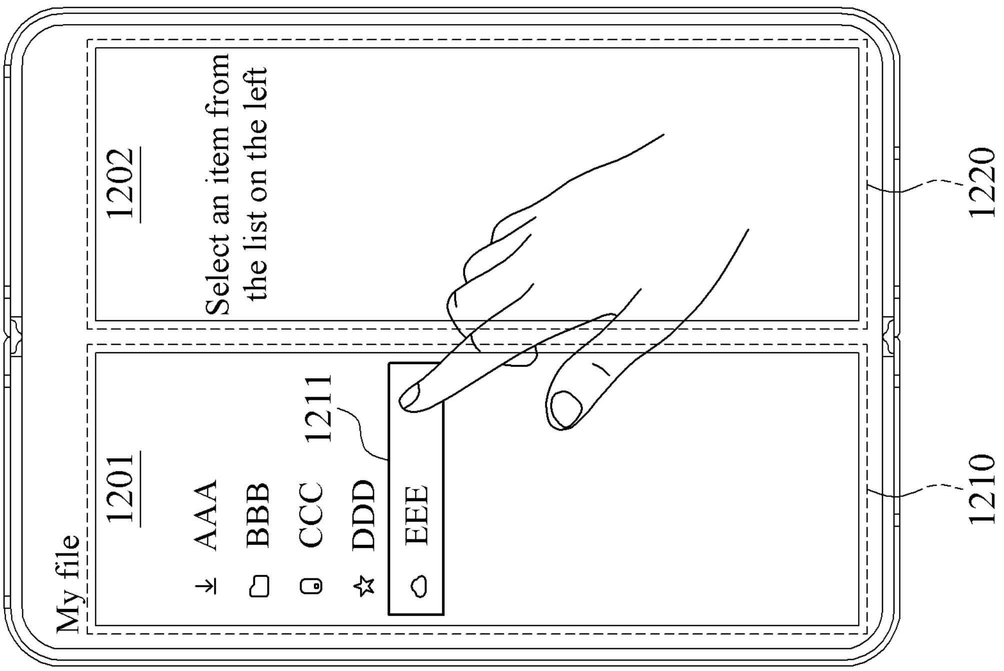
FIGS. 12A and 12B are diagrams illustrating an example of displaying a default screen on a region on which a dependent window is displayed before the dependent window is called according to various example embodiments.
Figure 12B:
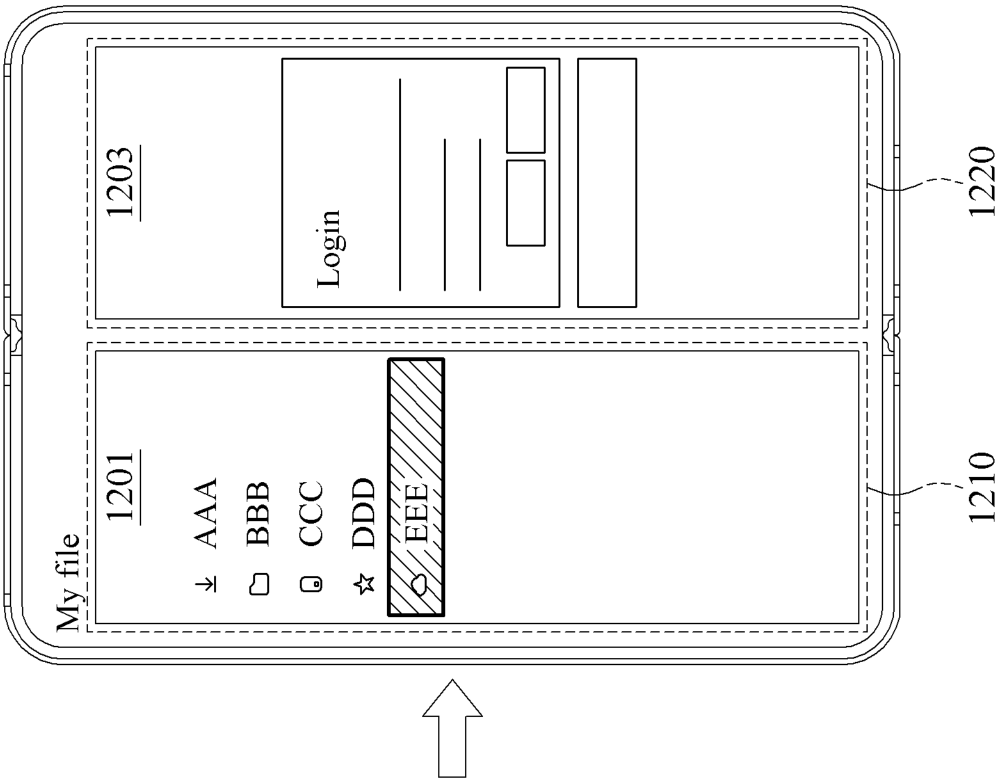

According to an example embodiment, a default screen may be displayed on a second region before a dependent window is called. For example, referring to FIG. 12A, before a dependent window is called, a host window 1201 may be displayed on a first region 1210, and a first dependent window 1202 may be displayed on a second region 1220 by an interface selected as the default screen or an initial value. For example, the dependent window 1202 may correspond to the default screen including a message, for example, "select an item from the list on the left," indicating that a window corresponding to an input to the host window 1201 displayed in the form of a list on the first region 1210 on a left side of a display is displayed on the second region 1220. For another example, dissimilar to FIG. 12A, before a dependent window is called, a first dependent window may be displayed on the second region 1220 by an interface selected as an initial value the same as the first dependent window corresponding to a preset item included in the host window 1201. Referring to FIG. 12B, a dependent window 1203 corresponding to an interfacing object 1211 selected by an input selecting the interfacing object 1211 (e.g., a set item) for calling a dependent window of the host window 1201 may be called, and the called dependent window 1203 may be stacked and displayed on the second region 1220.

Referring back to FIG. 9, an event occurring in a host window and an event occurring in a dependent window may correspond to an event generated by a user input, and whether a received user input generates the event of the host window or the event of the dependent window may be determined based on a region in the display 810 receiving the user input. For example, the user input may include a touch input received through the display 810. In this example, the touch input may generate the event of the host window displayed on the first region when a region receiving the touch input is included in the first region of the display 810, and may generate the event of the dependent window displayed on the second region when the region receiving the touch input is included in the second region of the display 810.

Figure 13:
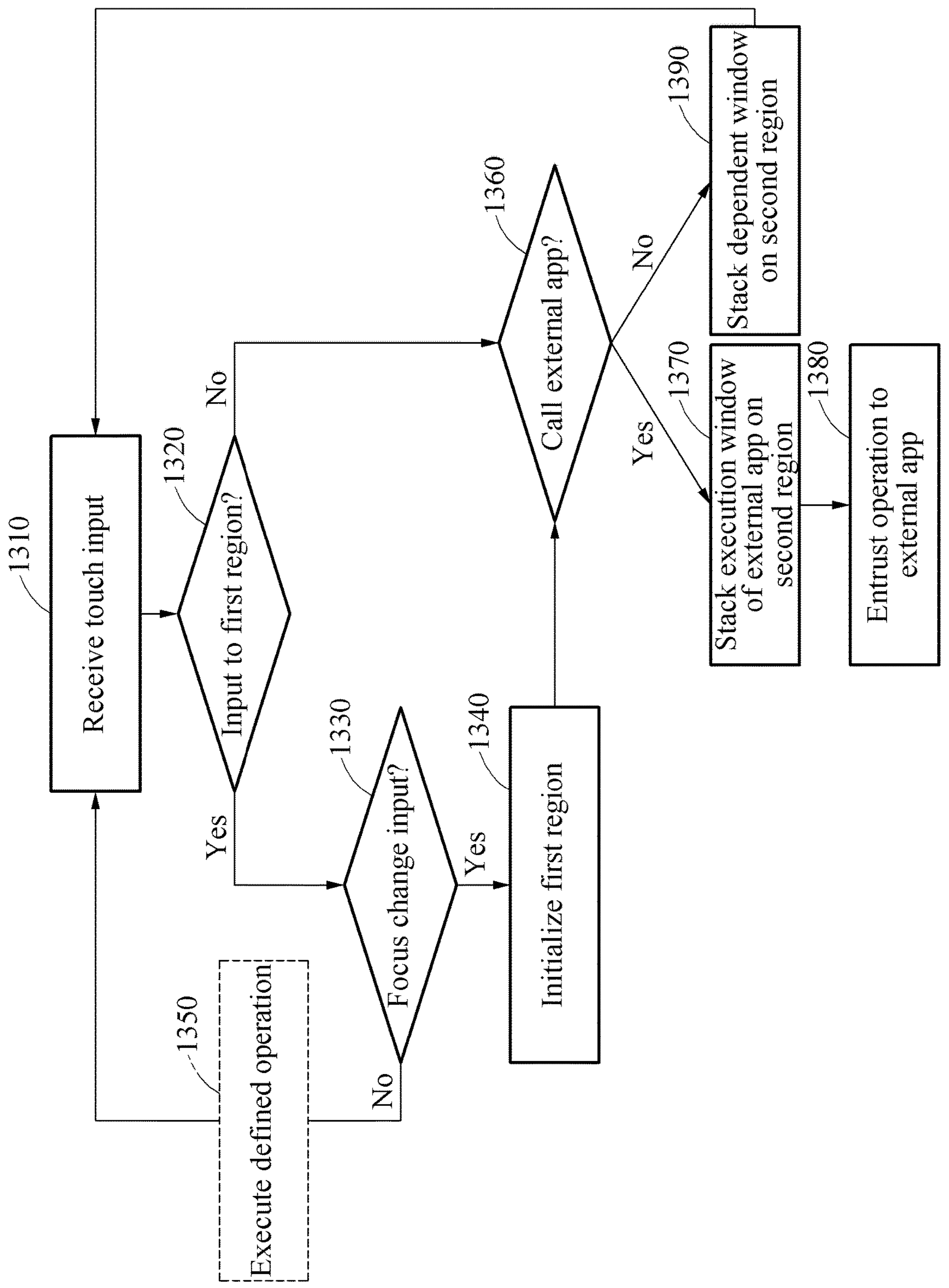
FIG. 13 is a flowchart illustrating an example flow of operations of a processor running an application (or app) according to various example embodiments.

For example, FIG. 13 is a flowchart illustrating an example flow of operations of the processor 120 running the application 146. For example, the operations may be performed to control the display 810 by the processor 120 in response to a user input while a host window corresponding to the application 146 is displayed on a first region which is a partial region of the display 810 and a first dependent window called from the host window is displayed on a second region which is another partial region of the display 810.

Referring to FIG. 13, the processor 120 may receive a touch input through the display 810 in operation 1310, and determine whether the received touch input is an input to the first region based on a region receiving the touch input in operation 1320. When the region receiving the touch input is included in the first region, the processor 120 may determine that the touch input is the input to the first region, and determine whether the touch input is a focus change input that generates a focus change event of changing a focus on the host window displayed on the first region in operation 1330. When the touch input is determined to be the focus change event, the processor 120 may initialize the window display on the second region in operation 1340. When the touch input is determined not to be the focus change event, an operation of the host window defined in response to the received touch input may be executed in operation 1350. As described above, the focus change input may be an input changing the focus to another dependent window, and may thus correspond to an input calling the other dependent window. Thus, when the touch input is the focus change input, operations 1360 through 1390 may be performed to initialize the window display on the second region and display the called dependent window on the second region.

When the region receiving the touch input is included in the second region, the processor 120 may determine the touch input not to be the input to the first region. That is, when the region receiving the touch input is included in the second region, the processor 120 may determine the touch input to be an input to the second region. As described above, the input to the second region may generate an event of the first dependent window displayed on the second region. As described above, the event occurring in the first dependent window may include an event of receiving an input calling a dependent window corresponding to a lower depth of the first dependent window and/or an event of receiving an input calling an execution window of an external application (e.g., the application 146) connected to the first dependent window. The processor 120 may determine whether the received touch input is the input calling the execution window of the external application 146 in operation 1360, and stack the execution window of the external application 146 or stack a dependent window corresponding to a lower depth of the first dependent window on the second region in operation 1370 or 1390. When the touch input is the input calling the execution window of the external application 146, an execution operation of a second dependent window may be entrusted to the external application 146 in operation 1380. That is, the execution operation of the second dependent window may be performed according to an execution code included in the external application 146. According to an example embodiment, when the called window is not the external application 146, the called dependent window may be stacked and displayed on the second region in operation 1390, and the operations may be repeated in response to a subsequent touch input being received in operation 1310.

Although the example of FIG. 13 has been described under the assumption that a touch input received in a second region is an input calling another dependent window, the received touch input may also include an input generating another operation associated with a first dependent window in addition to the input calling the dependent window. Although not illustrated in FIG. 13, the processor 120 may determine whether the touch input received in the second region is an input calling another dependent window, and execute an operation of a first dependent window defined in response to the received touch input when the touch input received in the second region is not the input calling another dependent window.

Referring back to FIG. 9, a first region of the display 810 on which a host window is displayed and a second region of the display 810 on which a dependent window is displayed may be determined based on a form factor structure of the electronic device 101. The form factor structure of the electronic device 101 may include a foldable structure and/or a structure with a variable size of the display 810. The electronic device 101 having the foldable form factor structure may be referred to herein as a foldable device, and the electronic device 101 having the form factor structure with a variable size of the display 810 may be referred to herein as a rollable device (or a slidable device). The foldable form factor structure may be classified into various types based on a folding direction and the number of folds and include, for example, a half fold, a tri-fold, a gatefold, a Z-fold, a double parallel fold, a French fold, an accordion fold, a barrel fold, a closed gatefold, and/or a map fold. The form factor structure having the variable size of the display 810 may be classified into various types based on a degree to which a length of the display 810 is variable in at least one direction and/or a direction in which the length is variable, and may include, for example, a structure that is variable by a size corresponding to one display or two displays in a first corner direction of the display 810.

According to an example embodiment, the application 146 may obtain information associated with a structure of the visually exposed display 810 of the electronic device 101. The information associated with the structure of the visually exposed display 810 may be determined according to a form factor structure of the electronic device 101. For example, the information associated with the structure of the visually exposed display 810 may include the size of the visually exposed display 810, and a position of a folding axis on which the visually exposed display 810 is folded and/or a folding direction in which the visually exposed display 810 is folded in the case of a foldable structure.

The size of the visually exposed display 810 may be determined according to the form factor structure of the electronic device 101. For example, the size of the visually exposed display 810 may be determined based on an extent to which the display 810 is expanded or reduced in the case of a rollable structure, or determined based on whether it is folded or unfolded in the case of a foldable structure.

Figure 14A:
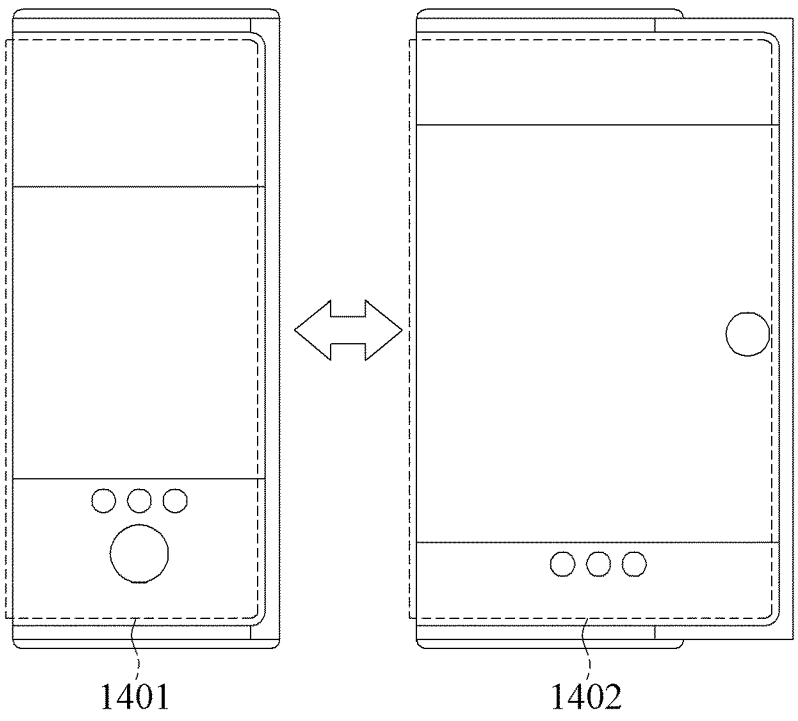
FIGS. 14A, 14B, and 14C are diagrams illustrating examples of a size of a display exposed based on a form factor structure according to various example embodiments.
Figure 14B:
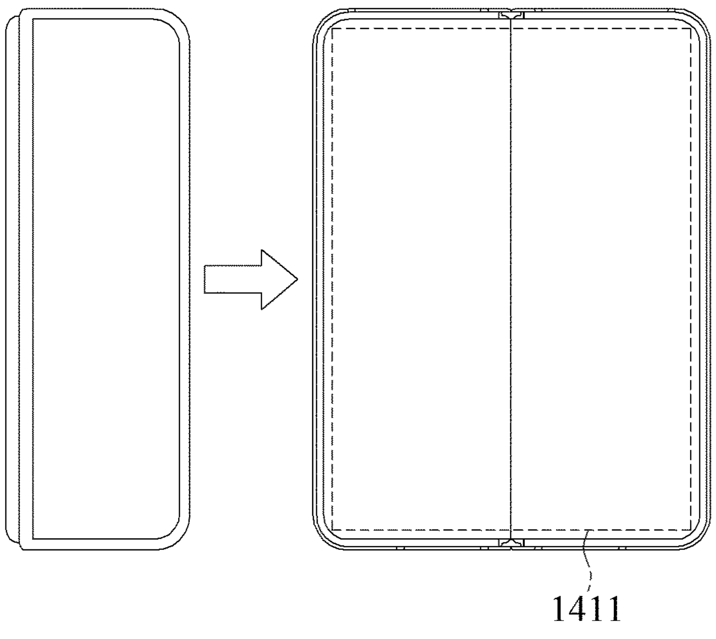
Figure 14C:
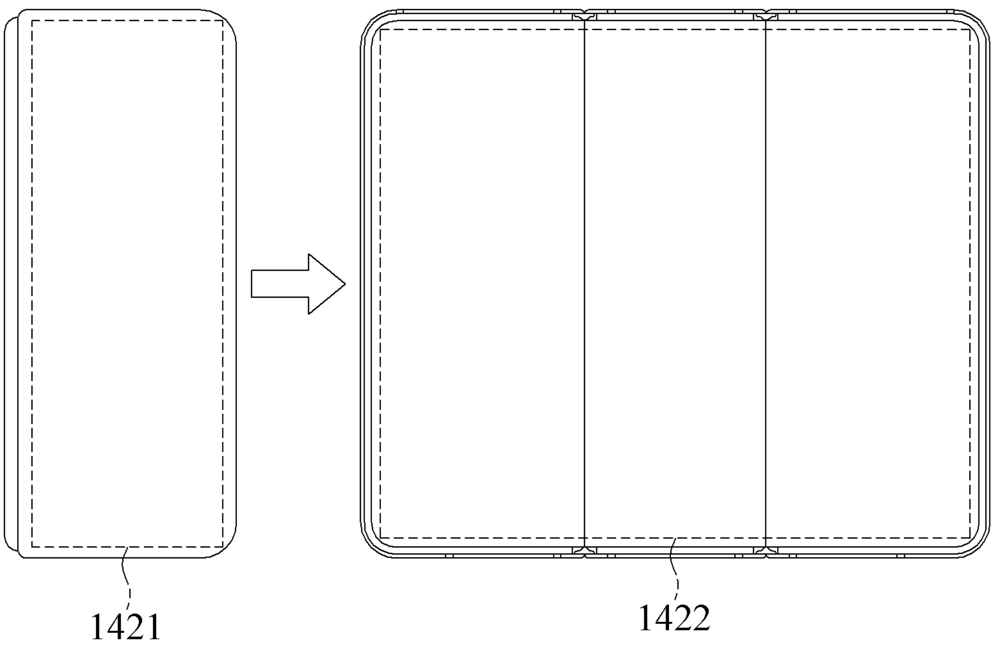

For example, referring to FIG. 14A, a display 1401 may be visually exposed when a rollable device is in a reduced state, and a display 1402 may be visually exposed when the rollable device is in an expanded state. Referring to FIG. 14B, when a form factor structure of a foldable device is a half-fold structure, a display may not be visually exposed when the device is in a folded state, and a display 1411 may be visually exposed when the device is in an unfolded state. Referring to FIG. 14C, when a form factor structure of a foldable device is a Z-fold structure, a display 1421 may be visually exposed when the device is in a folded state, and a display 1422 may be visually exposed when the device is in an unfolded state.

Referring back to FIG. 9, the application 146 may determine a layout for displaying at least one execution window corresponding to the application 146 based on the obtained information associated with the visually exposed display 810.

The determining of the layout may include determining whether to display a host window and a dependent window on a split-screen or a single screen. The displaying on the single screen may correspond to displaying a single window on a full screen of the display 810, and the displaying on the split-screen may correspond to respectively displaying a plurality of windows on split regions of the display 810. For example, the application 146 may determine to display a window on the single screen when the size of the visually exposed display 810 is less than or equal to a threshold value, and display a window on the split-screen when the size exceeds the threshold value. In addition, when the displaying on the split-screen is determined, the determining of the layout may include determining the number of regions of the split-screen on which dependent windows are to be displayed. For example, when the size of the visually exposed display 810 exceeds a second threshold value, the application 146 may determine to split a screen into three and determine to display dependent windows on two of the split screen. In one embodiment, the determination that visually exposed display 810 exceeds a second threshold value indicates that the layout is a tri-fold screen. In another embodiment, the determination that visually exposed display 810 exceeds a second threshold value indicates that the electronic device is a rollable device.

Based on the determined layout, a first region and a second region may be determined. The determining of the first region and the second region may include determining a position and size of the first region in the display 810 for displaying the host window, and determining a position and size of the second region in the display 810 for displaying a dependent window.

For example, when the layout is determined for displaying on a single screen, the second region may be determined to be the same region as the first region or at least a portion of the first region. For example, the second region may be displayed by being overlaid on the first region.

For another example, when the layout is determined for displaying on the split screen, the positions and sizes of the first region and the second region may be determined based on a structure of the visually exposed display 810. For example, in the case of a foldable device of a half-fold structure including a single folding axis, the visually exposed display 810 may be split into two regions with respect to the folding axis when the foldable device is unfolded. In this example, of the two regions including a left region and a right region divided with respect to the folding axis, the left region may be determined to be the first region and the right region may be determined to be the second region. For another example, in the case of a foldable device of a tri-fold or Z-fold structure including two folding axes, the visually exposed display 810 may be split into three regions with respect to the two folding axes when the foldable device is unfolded. In this example, of the regions including a left region, a middle region, and a right region divided with respect to the folding axes, the left region may be determined to be the first region, and the middle region and the right region may be determined to be the second region. In this example, a dependent window may be displayed on each of the middle region and the right region. For example, based on a stacked structure, a most recently called dependent window may be displayed on the right region, and a second most recently called dependent window may be displayed on the middle region.

Although regions split based on a folding axis may be determined to be the first region and the second region as described above, regions split based on an arbitrary axis that is not the folding axis may also be determined to be the first region and the second region.

For example, in the case of a rollable device with a variable size of the display 810, a partial region of the display 810 of an expanded size may be determined to be the first region, and another partial region may be determined to be the second region. For example, when the display 810 of the rollable device is expanded to be horizontally long (e.g., in an x-axis direction of FIG. 5B), regions split based on at least one vertical axis (e.g., a y axis of FIG. 5B) for dividing a horizontal length may be determined to be the first region and the second region. For example, two regions may be obtained through the splitting when the size of the display 810 is greater than or equal to a first threshold value, and three regions may be obtained through the splitting when the size is greater than or equal to a second threshold value. In this example, the first threshold value may refer to a reference value for splitting the display 810 into two regions, and may be a preset value corresponding to the application 146 or the electronic device 101. The second threshold value may refer to a reference value for splitting the display 810 into three regions, and may be a preset value corresponding to the application 146 or the electronic device 101. For example, the second threshold value may be determined to be greater than the first threshold value.

According to an example embodiment, the processor 120 may receive a request for execution of the application 146 to run the application 146, and obtain the position and size of the first region in the display 810 based on the running application 146. The processor 120 may control the display 810 to display a host window corresponding to the application 146 on the first region, and receive an input calling a first dependent window among a plurality of dependent windows through the host window. When receiving the input calling the first dependent window, the processor 120 may obtain the position and size of the second region in the display 810 based on the running application 146. The processor 120 may then call the first dependent window and control the display 810 to display the first dependent window on the second region.

The application 146 for determining a layout may determine the layout based on a flag associated with the availability of a split screen. For example, the flag indicating the availability of the split-screen may have a first value indicating that the split-screen is available, and a second value indicating that the split-screen is not available. A value of the flag of the application 146 may be determined in advance based on an identifier of the application 146. For example, some applications may be set to have only the second value, and other applications may be set to have both the first value and the second value. For example, the flag of the application 146 set to have both the first value and the second value may be determined to have any one of the first value and the second value according to a setting by a user.

For example, when the flag associated with the availability of the split-screen has the first value, the application 146 may use the split screen, and thus an operation of determining a layout based on the size of the display 810 may be performed. However, the application 146 having the second value of the flag may not use the split screen, and the operation of determining a layout may not be performed, and a window may be displayed on a single screen.

According to an example embodiment, when the structure of the visually exposed display 810 is changed, the processor 120 may control a screen to be displayed on the display 810. The change in the structure of the visually exposed display 810 may include a change in the size of the visually exposed display 810 and/or a change in a gradient (or angle) between housings split with respect to a folding axis. Based on the change, the number of windows to be displayed may be changed and positions of the windows in the display 810 may be changed.

For example, in a case in which the size of the visually exposed display 810 is increased by a change in a form factor structure of the electronic device 101 when stacking and displaying a second dependent window on the second region, the processor 120 may further display at least one of the host window and the first dependent window on the display 810 based on whether the first region is exposed. In this example, the processor 120 may further display the first dependent window on the display 810 when the first region is exposed, and further display the host window on the display when the first region is not exposed. An operation of controlling a screen to be displayed on a display based on a change in a form factor structure will be described in detail later with reference to FIGS. 15A through 19.

According to an example embodiment, an electronic device 101 may include a display 810 configured to output a screen thereon, a memory 130 configured to store therein at least one application 146, and a processor 120 operatively connected to the display 810 and the memory 130 and configured to execute the application 146 to control the screen to be displayed on the display 810. As the application 146 is run, the processor 120 may display a host window corresponding to the application 146 on a first region of the display 810, display a first dependent window on a second region of the display 810 based on a call of the first dependent window among windows that are dependent on the host window, stack and display a second dependent window among the dependent windows on the second region based on an event occurring in the first dependent window, and initialize the window display on the second region based on an event occurring in the host window.

For example, for displaying on the first region of the display 810, the processor 120 may obtain, from the application 146, information associated with the first region determined based on a form factor structure of the electronic device 101. The information associated with the first region may include position information and size information of the first region of the display 810.

For example, for displaying on the second region of the display 810, the processor 120 may obtain, from the application 146, information associated with the second region determined based on the form factor structure of the electronic device 101. The information associated with the second region may include position information and size information of the second region in the display 810.

For example, the second region may be determined to be the same region as the first region when the size of the display 810 exposed based on the form factor structure of the electronic device 101 is less than or equal to a preset threshold value corresponding to the application 146, and determined to be a region distinguished from the first region when the size of the display 810 exposed based on the form factor structure of the electronic device 101 exceeds the preset threshold value corresponding to the application 146.

For stacking and displaying the second dependent window, the processor 120 may further display at least one of the host window and the first dependent window based on whether the first region is exposed when the size of the display 810 is increased by a change in the form factor structure of the electronic device 101.

For further displaying on the display 810, the processor 120 may further display the first dependent window on the display 810 when the first region is exposed, and further display the host window on the display 810 when the first region is not exposed.

For example, for initializing the window display on the second region, the processor 120 may initialize the window display on the second region based on whether the event occurring in the host window is a focus change event.

For example, the dependent windows may include at least one of an execution window of the app146 corresponding to a lower depth of the host window and an execution window of an external application linked to the host window.

Figure 15A:
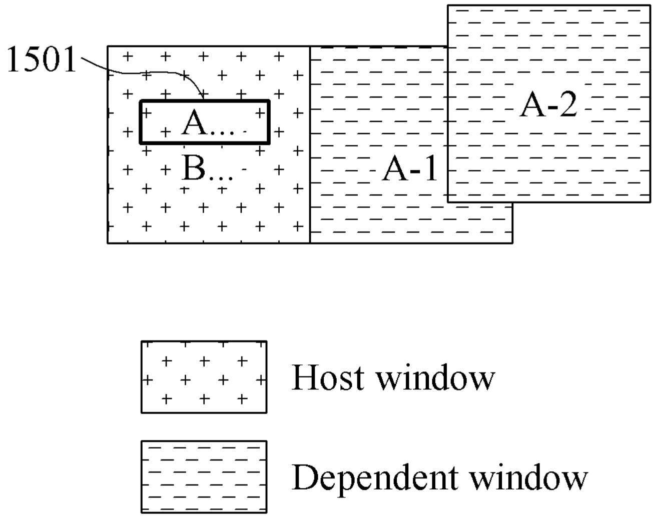
FIGS. 15A and 15B are diagrams illustrating examples of a stacked structure of windows according to various example embodiments.
Figure 15B:
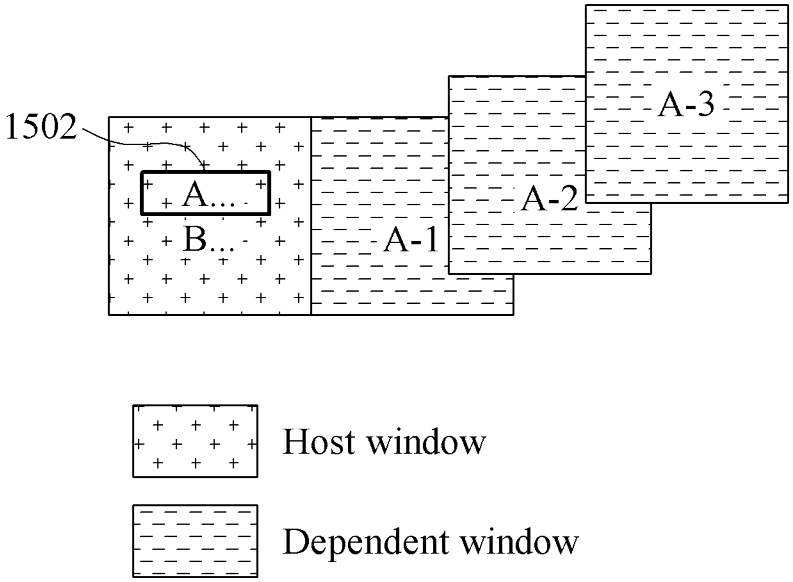

FIGS. 15A and 15B are diagrams illustrating examples of a stacked structure of windows according to various example embodiments.

Referring to FIGS. 15A and 15B, a host window may be displayed on a left region of a display, and one or more dependent windows corresponding to the host window may be stacked and displayed on a right region of the display.

For example, referring to FIG. 15A, a dependent window A-1 corresponding to a host window may be called first in response to reception of a signal calling a dependent window such as an input selecting an item 1501 from the host window. Subsequently, another dependent window A-2 may be displayed by being stacked on the dependent window A-1 by an interface in the dependent window A-1.

For another example, referring to FIG. 15B, a dependent window A-1 corresponding to a host window may be called first in response to reception of a signal calling a dependent window such as an input selecting an item 1502 from the host window. Subsequently, another dependent window A-2 may be displayed by being stacked on the dependent window A-1 by an interface in the dependent window A-1, and another dependent window A-3 may be displayed by being stacked on the dependent window A-2 by an interface in the dependent window A-2.

FIGS. 16A through 19 are diagrams illustrating example operations of controlling a screen to be displayed on a display of an electronic device based on a change in a form factor structure according to various example embodiments.

According to an example embodiment, screen control described hereinafter with reference to FIGS. 16A through 19 may be performed by a processor (e.g., the processor 120 of FIG. 1 or the processor 120 of FIG. 9) of an electronic device (e.g., the electronic device 101 of FIG. 1, the electronic device 200 of FIGS. 2 through 4B, the electronic device 500 of FIGS. 5A through 6B, or the electronic device 101 of FIG. 9). A display to be described hereinafter with reference to FIGS. 16A through 19 may correspond to the display module 160 of FIG. 1, the display 250 of FIG. 2, the display 250 of FIGS. 4A and 4B, the display 530 of FIGS. 5A and 5B, the display module 160 of FIG. 8, or the display 810 of FIG. 9. An application to be described hereinafter with reference to FIGS. 16A through 19 may correspond to the application 146 of FIG. 1, the application 146 of FIG. 7, or the application 146 of FIG. 9.

Figure 16A:
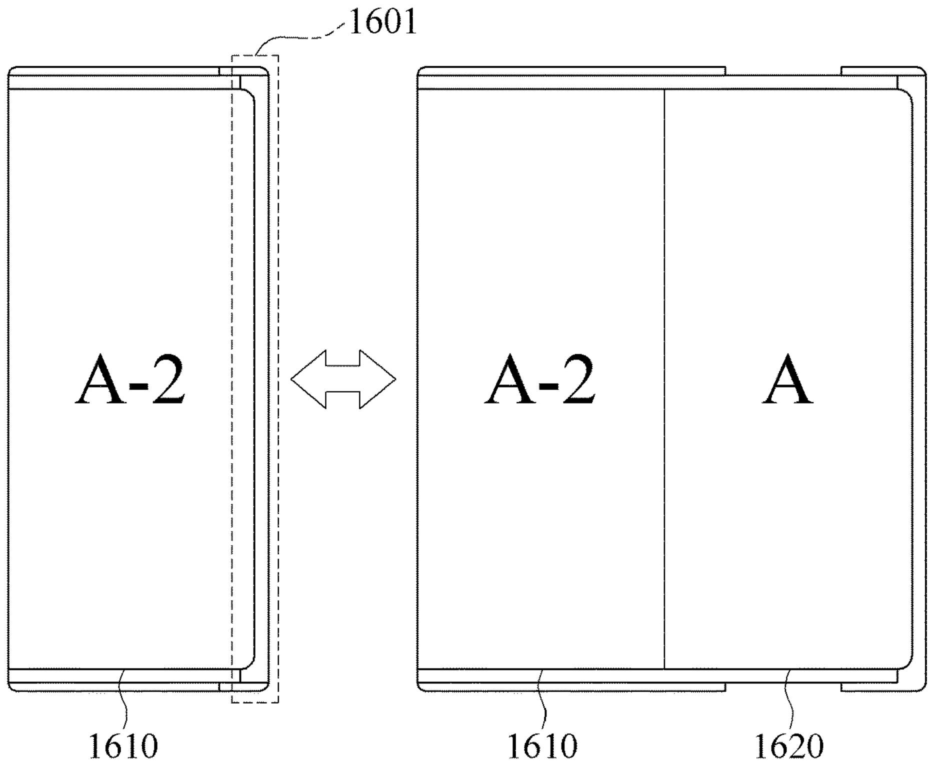
FIGS. 16A and 16B are diagrams illustrating examples of a screen displayed on a display based on a change in a structure of an exposed display when a stacked structure of windows is formed as illustrated in FIG. 15A.
Figure 16B:
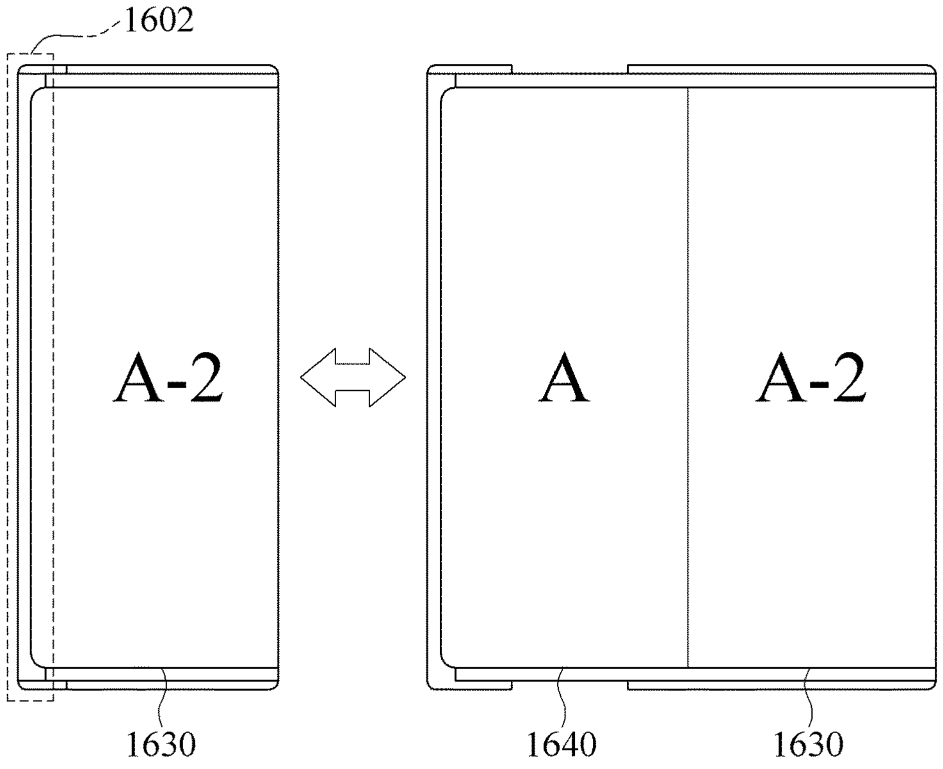

FIGS. 16A and 16B are diagrams illustrating examples of a screen displayed on a display based on a change in a structure of an exposed display when a stacked structure of windows is formed as illustrated in FIG. 15A.

Referring to FIGS. 16A and 16B, when a width of the display is expanded by a first threshold value or greater while only a dependent window A-2 is being displayed on the display that is not expanded, a screen to be displayed on the display may be controlled such that a host window A is further displayed. A region on which the host window A is displayed may not be exposed to the display before the expansion.

For example, as illustrated in FIG. 16A, when the display is expanded rightward from a region 1610 on which the dependent window A-2 is displayed, the host window A may be displayed on a region 1620 newly exposed by the expansion. In this example, as the display is expanded, the newly exposed region 1620 may be determined to be a region on which the host window A is to be displayed. In the example of FIG. 16A, the case in which the display is expanded rightward from the region 1610 may include when a display of a rollable device is expanded rightward, and when a foldable device is changed, to an unfolded state, from a folded state with a rear surface of a housing being in contact with respect to a folding axis 1601. For another example, as illustrated in FIG. 16B, when the display is expanded leftward from a region 1630 on which the dependent window A-2 is displayed, the host window A may be displayed on a region 1640 that is newly exposed by the expansion. In this example, as the display is expanded, the newly exposed region 1640 may be determined to be a region on which the host window A is to be displayed. In the example of FIG. 16B, the case in which the display is expanded leftward from the region 1630 may include when a display of a rollable device is expanded leftward, and when a foldable device is changed, to an unfolded state, from a folded state with a rear surface of a housing being in contact with respect to a folding axis 1602.

Figure 17:
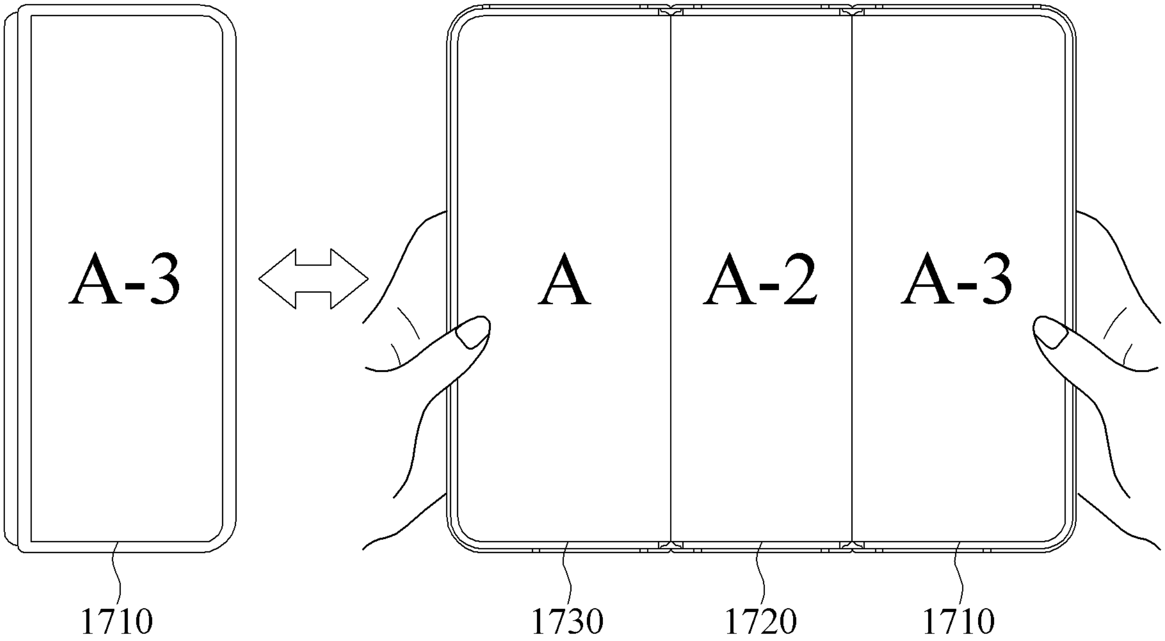
FIGS. 17, 18A, and 18B are diagrams illustrating examples of a screen displayed on a display based on a change in a structure of an exposed display when a stacked structure of windows is formed as illustrated in FIG. 15B.
Figure 18A:
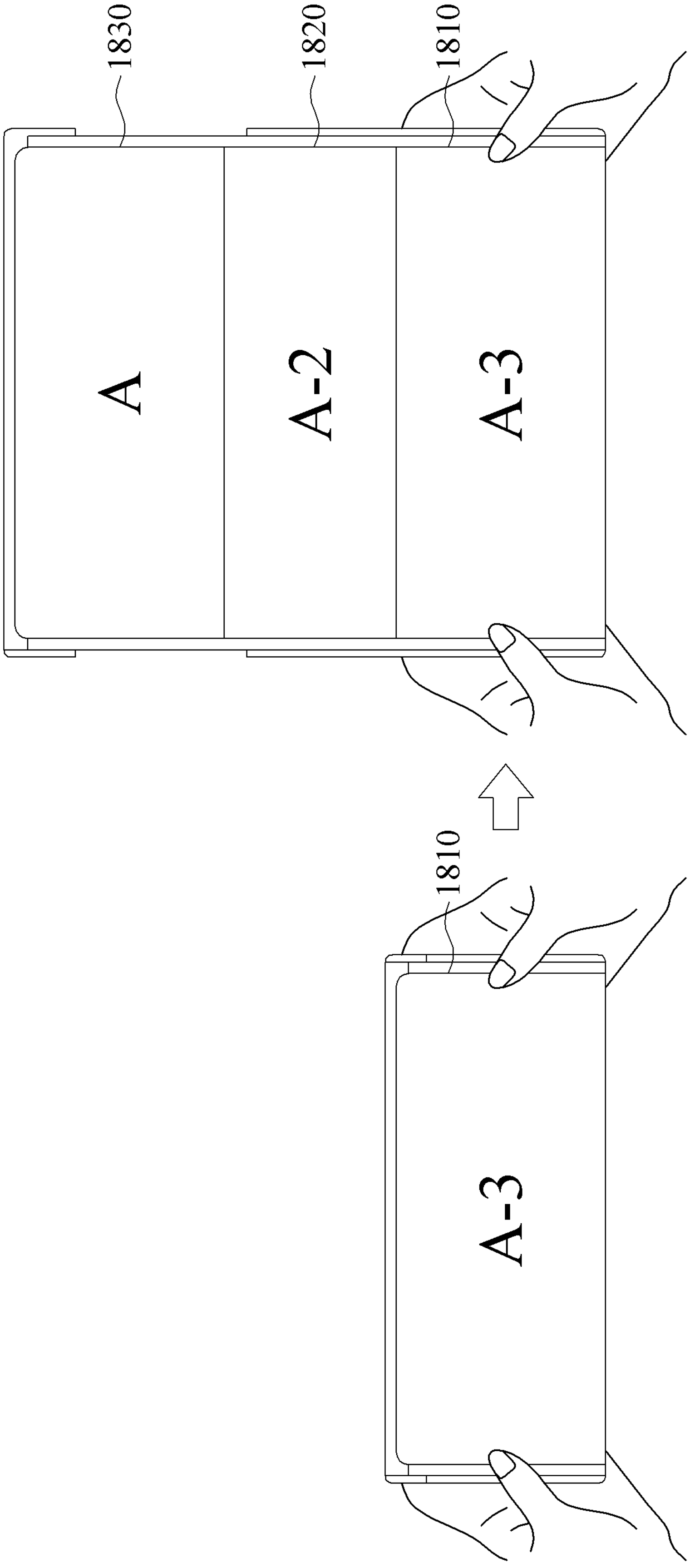
Figure 18B:
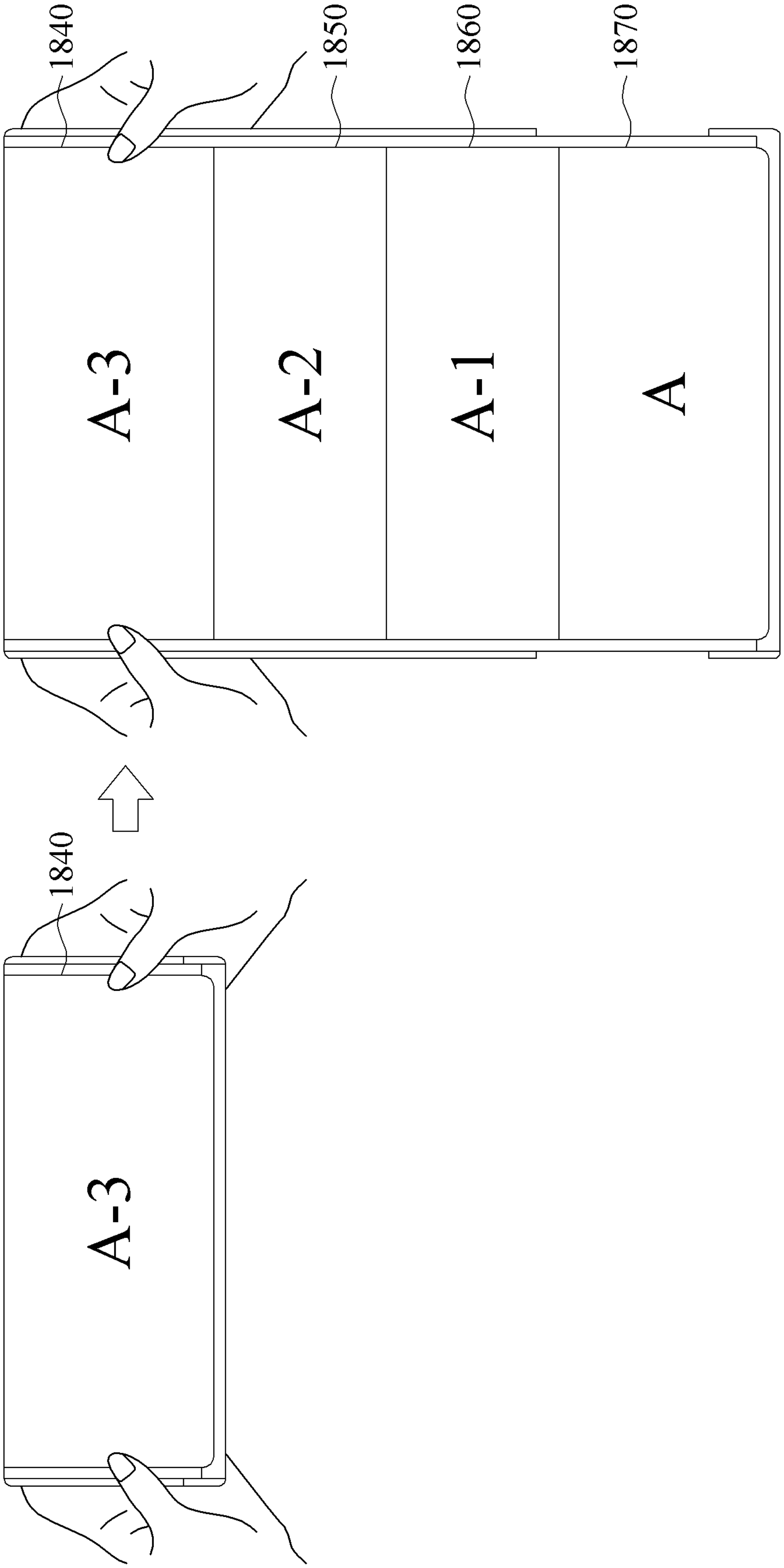

FIGS. 17, 18A, and 18B are diagrams illustrating examples of a screen displayed on a display based on a change in a structure of an exposed display when a stacked structure of windows is formed as illustrated in FIG. 15B.

Referring to FIG. 17, when a width of the display is expanded by a second threshold value or greater while only a dependent window A-3 is being displayed on an exposed region of the display, a region 1720 and a region 1730 may be added to the exposed region of the display. A screen to be displayed on the display may be controlled such that a host window A and a dependent window A-2 previously called before the dependent window A-3 is called are displayed on the newly exposed regions 1720 and 1730.

According to an example embodiment, regions on which a host window and a dependent window are to be displayed may be determined based on a relative positional relationship between a region of the display newly exposed by an expansion of the display and a region of the display exposed before the expansion of the display. For example, referring to FIG. 17, when the newly exposed regions 1720 and 1730 of the display are disposed on the left side from the previously exposed region 1710 of the display, a host window and a previously called dependent window may be determined to be displayed on the regions 1720 and 1730 on the left side.

According to an example embodiment, a host window and a dependent window may be determined to be displayed at absolute positions in the display. For example, even when a newly exposed region of the display is disposed on the right side from a previously exposed region of the display irrespective of a relative position between the newly exposed region and the previously exposed region, a host window may be displayed on the left region 1730 and a dependent window may be displayed on the right region 1710, and a previously called dependent window may be displayed on the middle region 1720, as illustrated in FIG. 17.

Referring to FIGS. 18A and 18B, the display may also be expanded up and down instead of a left-right direction. As described above with reference to FIGS. 16A through 17, regions on which a host window and dependent windows are to be displayed in an expanded display may be determined based on a stacked structure, according to the same principle applied to the expansion in the left-right direction.

For example, referring to FIG. 18A, when a height of the display is expanded by a third threshold value or greater while only a region 1810 on which a dependent window A-3 is displayed is included in an exposed region of the display, a screen to be displayed on the display may be controlled such that a dependent window A-2 previously called before the dependent window A-3 and a host window A are to be displayed on newly exposed regions 1820 and 1830.

For another example, referring to FIG. 18B, when the height of the display is expanded by a fourth threshold value or greater while only a region 1840 on which a dependent window A-3 is displayed is included in an exposed region of the display, a screen to be displayed on the display may be controlled such that two dependent windows A-1 and A-2 previously called before the dependent window A-3 and a host window A are to be displayed on newly exposed regions 1850, 1860, and 1870. In the foregoing examples, the third threshold value and the fourth threshold value may be threshold values associated with the height of the display. The third threshold value may correspond to a reference for splitting the display expandable up and down into three regions, and the fourth threshold value may correspond to a reference for splitting the display expandable up and down into four regions.

A dependent window or a host window that is to be additionally displayed by an expansion of the display may not be necessarily displayed on a newly exposed region, but be determined to be displayed at absolute positions in the expanded display as described above. For example, the host window may be displayed on an upper end region of the display, and dependent windows may be displayed from the upper-end region to a lower end region based on a stacked structure according to an order in which the dependent windows are called. In this example, unlike what is illustrated in FIG. 18B, a host window A may be displayed on the region 1840, a first called dependent window A-1 may be displayed on the region 1850, a subsequently called dependent window A-2 may be displayed on the region 1860, and then a most recently called dependent window A-3 may be displayed on the region 1870.

Figure 19:
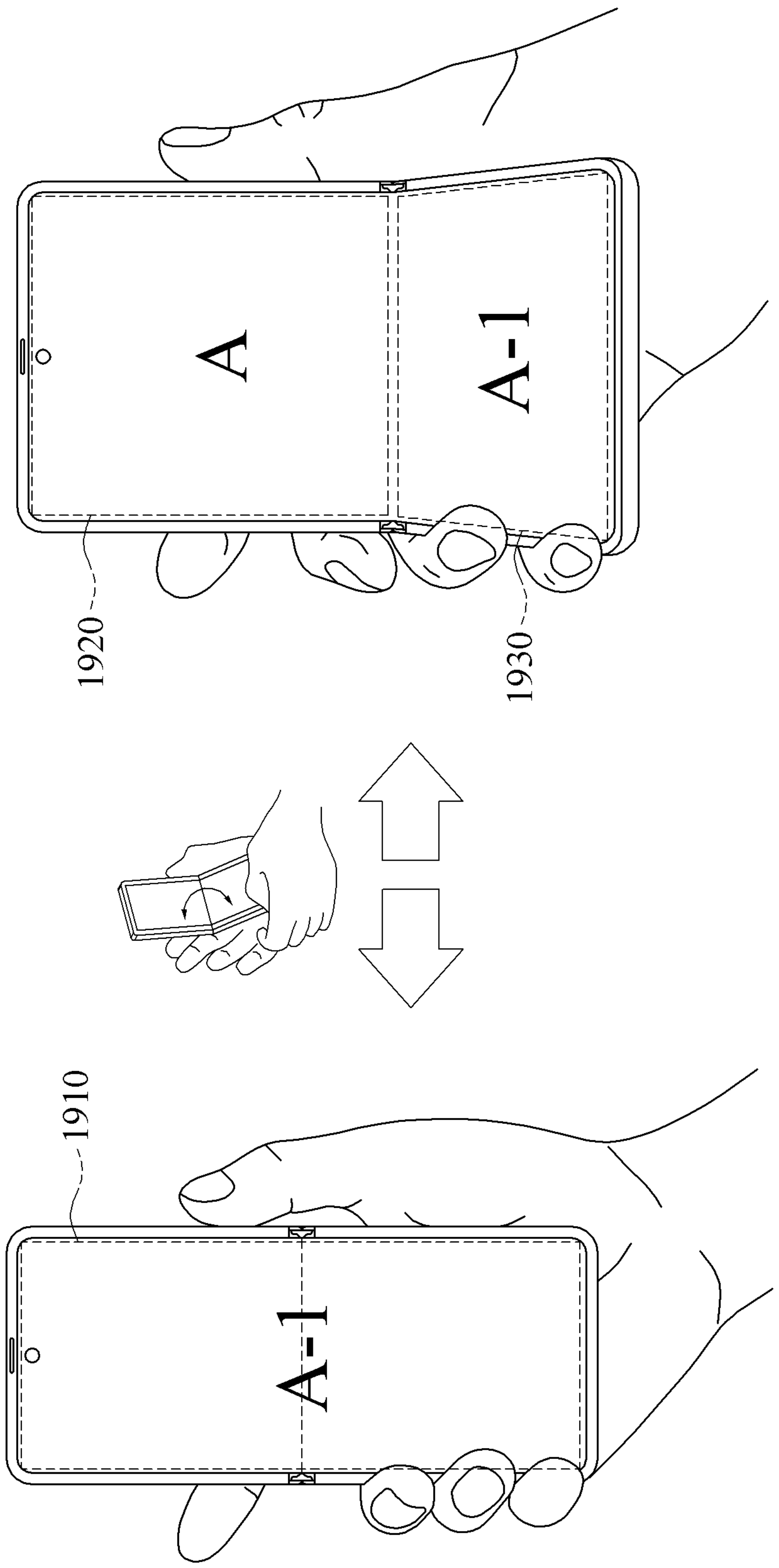
FIG. 19 is a diagram illustrating an example screen displayed on a display based on an angle change in a structure of an exposed display according to various example embodiments.

FIG. 19 is a diagram illustrating an example screen displayed on a display based on an angle change in a structure of an exposed display according to various example embodiments.

According to an example embodiment, in addition to when the size of the display is changed, even when an angle of a visually exposed display is changed based on a form factor structure of an electronic device, the number of regions to be displayed on the display may be changed.

Referring to FIG. 19, when the display is changed from being unfolded 180 degrees (°) to being folded by a certain degree or greater, the display may be switched to display a split-screen. In this case, while a dependent window A-1 is being displayed on a single screen, a region 1910 may be split into two regions 1920 and 1930 in response to a change in the angle of the display, and the display may be controlled such that a host window A is displayed on the first region 1920 between the two regions 1920 and 1930 and a dependent window A-1 is displayed on the second region 1930 between the two regions 1920 and 1930.

Figure 20:
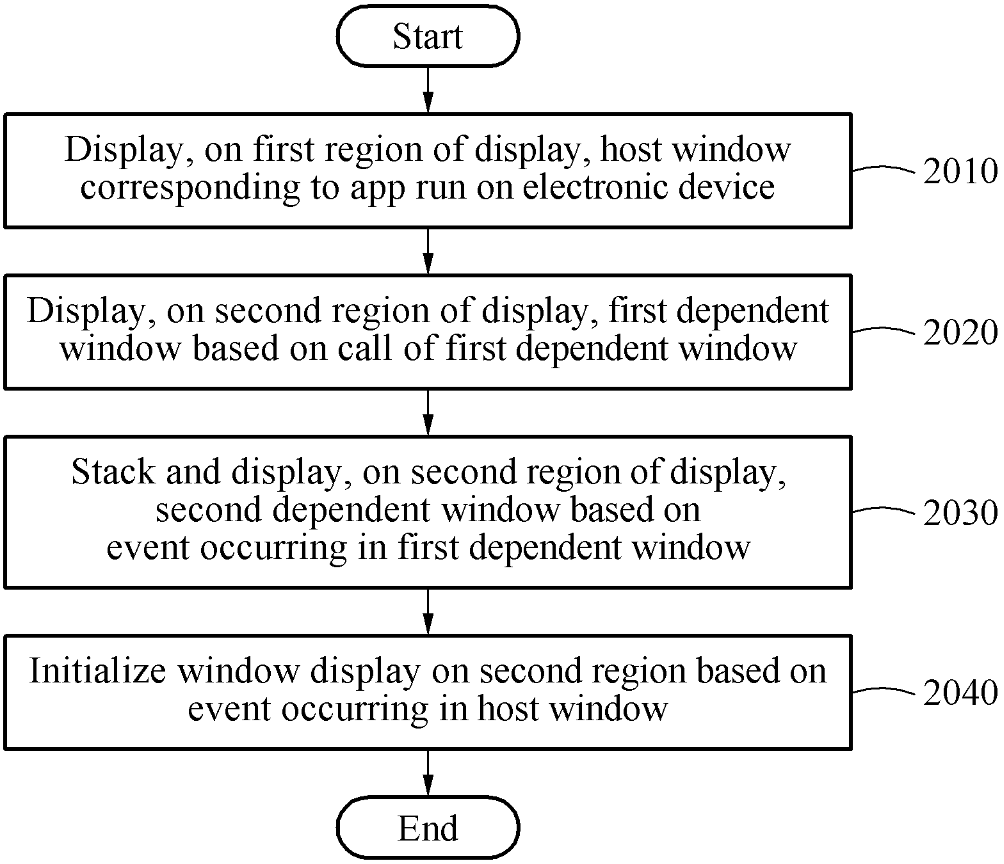
FIG. 20 is a flowchart illustrating an example flow of operations of a method of controlling a screen displayed on a display of an electronic device according to various example embodiments.

FIG. 20 is a flowchart illustrating an example flow of operations of a method of controlling a screen displayed on a display of an electronic device according to various example embodiments.

The method of controlling a screen described hereinafter with reference to FIG. 20 may be performed by a processor (e.g., the processor 120 of FIG. 1 or the processor 120 of FIG. 9) of an electronic device (e.g., the electronic device 101 of FIG. 1, the electronic device 200 of FIGS. 2 through 4B, the electronic device 500 of FIGS. 5A through 6B, or the electronic device 101 of FIG. 9). A display described hereinafter with reference to FIG. 20 may correspond to the display module 160 of FIG. 1, the display 250 of FIG. 2, the display 250 of FIGS. 4A and 4B, the display 530 of FIGS. 5A and 5B, the display module 160 of FIG. 8, or the display 810 of FIG. 9. An application described hereinafter with reference to FIG. 20 may correspond to the application 146 of FIG. 1, the application 146 of FIG. 7, or the application 146 of FIG. 9.

Referring to FIG. 20, the method of controlling a screen displayed on the display of the electronic device may include operation 2010 of displaying, on a first region in the display, a host window corresponding to an application run on the electronic device, operation 2020 of displaying a first dependent window on a second region in the display corresponding to the first region based on a call of the first dependent window among dependent windows that are dependent on the host window, operation 2030 of stacking and displaying a second dependent window on the second region based on an event occurring in the first dependent window, and operation 2040 of initializing the window display on the second region based on an event occurring in the host window.

For example, operation 2010 of displaying on the first region in the display may include obtaining, from the application, information associated with the first region determined based on a form factor structure of the electronic device. In this example, the information associated with the first region may include position information and size information of the first region in the display.

For example, operation 2020 of displaying on the second region in the display may include obtaining, from the application, information associated with the second region determined based on the form factor structure of the electronic device. In this example, the information associated with the second region may include position information and size information of the second region in the display.

For example, when the size of the display exposed according to the form factor structure of the electronic device is less than or equal to a preset threshold value corresponding to the application, the second region may be determined to be the same region as the first region. When the size of the display exposed according to the form factor structure of the electronic device exceeds the preset threshold value corresponding to the application, the second region may be determined to be a region distinguished from the first region.

For example, operation 2030 of stacking and displaying the second dependent window may include further displaying at least one of the host window and the first dependent window based on whether the first region is exposed, when the size of the display is increased by a change in the form factor structure of the electronic device.

The further displaying may include further displaying the first dependent window on the display when the first region is exposed, and further displaying the host window on the display when the first region is not exposed.

For example, operation 2040 of initializing the window display on the second region may include initializing the window display on the second region based on whether the event occurring in the host window is a focus change event.

Figure 21:
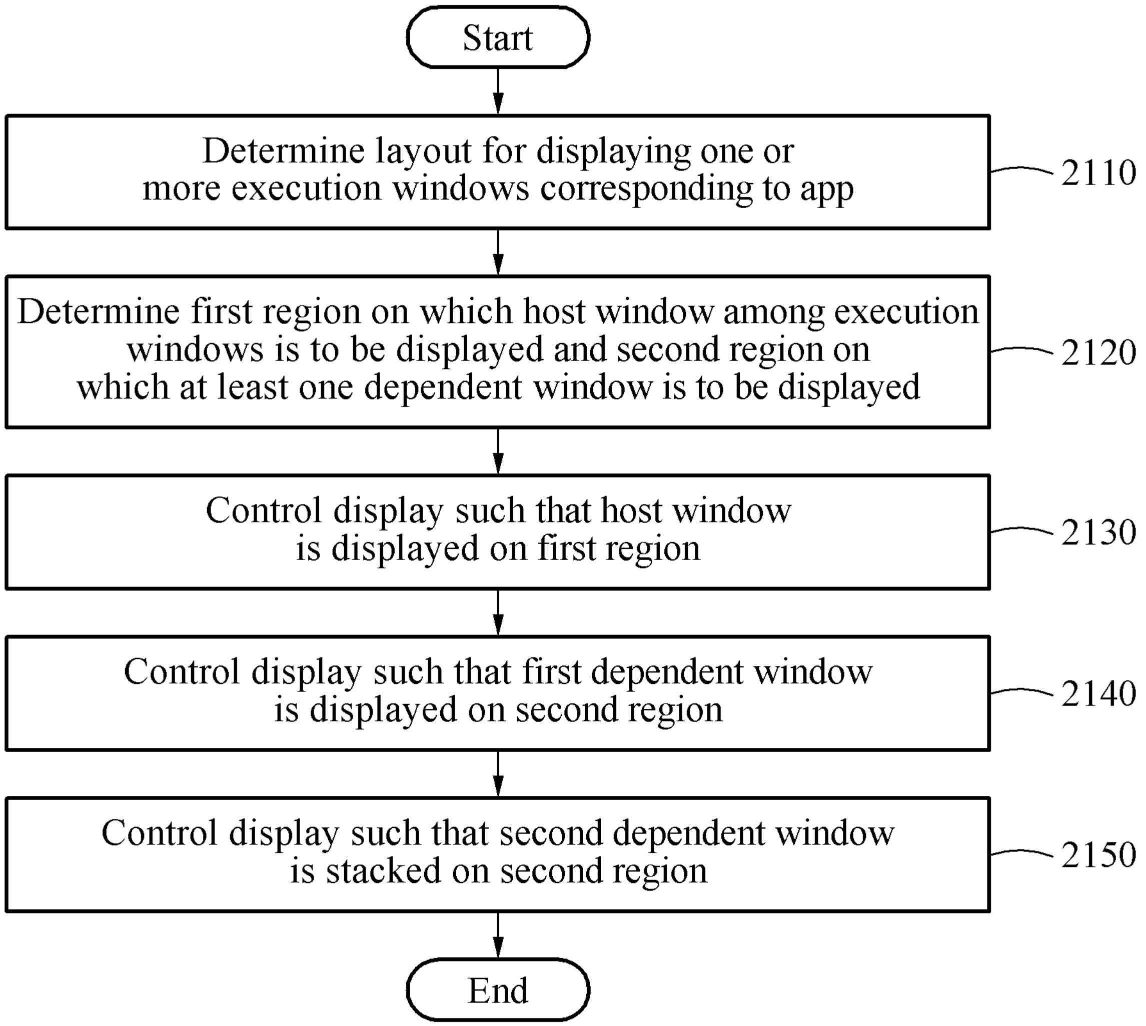
FIG. 21 is a flowchart illustrating an example flow of operations of an application performed by a processor of an electronic device according to various example embodiments.

FIG. 21 is a flowchart illustrating an example flow of operations of an application performed by a processor of an electronic device according to various example embodiments.

The operations of the application described hereinafter with reference to FIG. 21 may be performed by a processor (e.g., the processor 120 of FIG. 1 or the processor 120 of FIG. 9) of an electronic device (e.g., the electronic device 101 of FIG. 1, the electronic device 200 of FIGS. 2 through 4B, the electronic device 500 of FIGS. 5A through 6B, or the electronic device 101 of FIG. 9). A display described hereinafter with reference to FIG. 21 may correspond to the display module 160 of FIG. 1, the display 250 of FIG. 2, the display 250 of FIGS. 4A and 4B, the display 530 of FIGS. 5A and 5B, the display module 160 of FIG. 8, or the display 810 of FIG. 9. An application described hereinafter with reference to FIG. 21 may correspond to the application 146 of FIG. 1, the application 146 of FIG. 7, or the application 146 of FIG. 9.

Referring to FIG. 21, the method of operating the application performed by the processor of the electronic device may include: operation 2110 of determining a layout for displaying one or more execution windows corresponding to the application based on a structure of the display exposed according to a form factor of the electronic device; operation 2120 of determining a first region on which a host window among the execution windows is to be arranged and a second region on which one or more dependent windows that are dependent on the host window among the execution windows are to be arranged, based on the determined layout; operation 2130 of controlling the display such that the host window is displayed on the first region in response to a request for execution of the application; operation 2140 of controlling the display such that a first dependent window is displayed on the second region in response to an input calling the first dependent window received from the host window among the dependent windows; and operation 2150 of controlling the display such that a second dependent window is stacked on the second region in response to an input calling the second dependent window received from the first dependent window.

The method of operating the application may further include controlling the display such that the window display on the second region is initialized based on an event occurring in the host window.

For example, operation 2110 of determining the layout may include: determining the layout to be a single screen when the size of the display exposed according to a form factor structure of the electronic device is less than or equal to a preset threshold value corresponding to the application; and determining the layout to be a split-screen when the size of the display exposed according to the form factor structure of the electronic device exceeds the preset threshold value corresponding to the application.

For example, operation 2110 of determining the layout may include determining the layout based on a flag associated with availability of the split-screen included in the application and on a structure of the display exposed according to the form factor of the electronic device.

One or more embodiments of the invention are described with reference to the accompanying drawings, in which various embodiments are shown. One or more embodiments may, however, be embodied in many different forms, and should not be construed as limited to the embodiments set forth herein. Rather, these embodiments are provided so that this disclosure will be thorough and complete, and will fully convey the scope of embodiments of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for use in an electronic device, the method comprising:

while the electronic device is in a folded state, displaying, on a first display, a first dependent window corresponding to an application running on the electronic device, wherein the first display is exposed when the electronic device is in the folded state;

based on the first dependent window being displayed on the first display in the folded state and in response to a state of the electronic device changing from the folded state to an unfolded state, displaying, on a second display, a host window corresponding to the application on a first portion of the second display and the first dependent window on a second portion of the second display, wherein the second display comprises a region newly exposed when the electronic device is in the unfolded state that was not visible in the folded state; and based at least in part on a touch event occurring in the first dependent window, displaying a second dependent window corresponding to the application on the second portion of the second display while maintaining display of the host window on the first portion of the second display.

2. The method of claim 1, wherein dependent windows, including the first dependent window and the second dependent window, comprise at least one of an execution window of the application corresponding to a lower depth of the host window and an execution window of an external application linked to the host window.

3. The method of claim 1, wherein the host window comprises at least one of:

a main execution window corresponding to the application;

a window output based on execution of a root activity of the application;

a window corresponding to an uppermost depth in a hierarchical structure of the application; or a window set to be output as a default when running the application.

4. The method of claim 1, wherein a size of the second display is larger than a size of the first display.

5. The method of claim 1 further comprises:

based at least in part on a touch event occurring in the host window, initializing the second portion of the second display.

6. A foldable electronic device comprising:

a first display exposed while the electronic device is in a folded state;

a second display exposed while the electronic device is in an unfolded state;

a processor; and a memory storing instructions that, when executed by the processor, cause the electronic device to:

while the electronic device is in the folded state, display, on the first display, a first dependent window corresponding to an application running on the electronic device;

based on the first dependent window being displayed on the first display in the folded state and in response to a state of the electronic device changing from the folded state to the unfolded state, display, on the second display, a host window corresponding to the application on a first portion of the second display and the first dependent window on a second portion of the second display, wherein the second display comprises a region newly exposed when the electronic device is in the unfolded state that was not visible in the folded state; and based at least in part on a touch event occurring in the first dependent window, display a second dependent window corresponding to the application on the second portion of the second display while maintaining display of the host window on the first portion of the second display.

7. The foldable electronic device of claim 6, wherein dependent windows, including the first dependent window and the second dependent window, comprise at least one of an execution window of the application corresponding to a lower depth of the host window and an execution window of an external application linked to the host window.

8. The foldable electronic device of claim 6, wherein the host window comprises at least one of:

a main execution window corresponding to the application;

a window output based on execution of a root activity of the application;

a window corresponding to an uppermost depth in a hierarchical structure of the application; or a window set to be output as a default when running the application.

9. The foldable electronic device of claim 6, wherein a size of the second display is larger than a size of the first display.

10. The foldable electronic device of claim 6, wherein the processor is further configured to:

based at least in part on a touch event occurring in the host window, initialize the second portion of the second display.

* * * * *